United States Patent
Lorenz et al.

(10) Patent No.: US 10,913,321 B2
(45) Date of Patent: Feb. 9, 2021

(54) SUSPENSION SYSTEM

(71) Applicant: ArvinMeritor Technology, LLC, Troy, MI (US)

(72) Inventors: Edwin D. Lorenz, Grand Blanc, MI (US); Adam P. Sadlik, Clarkston, MI (US); Michael Schlundt, Royal Oak, MI (US); Rituja D. Marathe, Troy, MI (US)

(73) Assignees: ArvinMeritor Technology, LLC, Troy, MI (US); Nikola Motor Company, LLC, Phoenix, AZ (US)

( * ) Notice: Subject to any disclaimer, the term of this patent is extended or adjusted under 35 U.S.C. 154(b) by 148 days.

(21) Appl. No.: 16/291,456

(22) Filed: Mar. 4, 2019

(65) Prior Publication Data
US 2020/0282786 A1  Sep. 10, 2020

(51) Int. Cl.
*B60G 11/28* (2006.01)
*B60G 7/00* (2006.01)

(52) U.S. Cl.
CPC .............. *B60G 11/28* (2013.01); *B60G 7/001* (2013.01); *B60G 7/008* (2013.01); *B60G 2200/144* (2013.01); *B60G 2202/1524* (2013.01); *B60G 2204/1262* (2013.01); *B60G 2204/143* (2013.01); *B60G 2204/148* (2013.01); *B60G 2206/124* (2013.01); *B60G 2206/50* (2013.01); *B60G 2206/8201* (2013.01)

(58) Field of Classification Search
CPC .. B62D 7/18; B60G 2300/02; B60G 2300/14; B60G 2300/08; B60G 11/28; B60G 7/001; B60G 7/008; B60G 2206/124; B60G 2200/144; B60G 2202/1524; B60G 2204/1262; B60G 2204/143; B60G 2204/148; B60G 2206/8201
USPC .................................................. 280/124.135
See application file for complete search history.

(56) References Cited

U.S. PATENT DOCUMENTS

| | | |
|---|---|---|
| 2,866,651 A | 6/1956 | Powell |
| 2,971,772 A | 2/1961 | Tantlinger et al. |
| 2,998,264 A | 8/1961 | Stump |
| 3,007,716 A | 11/1961 | Maharick |
| 3,477,738 A | 11/1969 | Manning |
| 4,174,855 A | 11/1979 | Vandenberg |
| 4,274,338 A | 6/1981 | Uozumi |

(Continued)

FOREIGN PATENT DOCUMENTS

| | | |
|---|---|---|
| BR | P10405014 A | 6/2006 |
| CN | 204399316 U | 6/2015 |

(Continued)

OTHER PUBLICATIONS

Extended European Search Report dated Jul. 13, 2020, for related EP Appln. No. 20160108.5; 11 Pages.

(Continued)

*Primary Examiner* — James A Shriver, II
*Assistant Examiner* — Hilary L Johns
(74) *Attorney, Agent, or Firm* — Brooks Kushman PC

(57) ABSTRACT

A suspension system having a knuckle that rotatably supports a wheel end assembly. The knuckle may include a first platform that may have a toe link mount, a second platform that may have a stabilizer bar mount, a brake torque plate that may facilitate mounting of a brake subsystem, or combinations thereof.

20 Claims, 15 Drawing Sheets

(56) References Cited

U.S. PATENT DOCUMENTS

| | | | |
|---|---|---|---|
| 4,313,619 A | 2/1982 | Hailer | |
| 4,813,704 A | 3/1989 | Smith | |
| 4,974,872 A | 12/1990 | Riese | |
| 5,396,968 A | 3/1995 | Hasebe et al. | |
| 5,413,462 A | 5/1995 | Alberni | |
| 5,879,265 A | 3/1999 | Bek | |
| 5,927,417 A | 7/1999 | Brunner et al. | |
| 6,290,244 B1 | 9/2001 | Hosoya | |
| 6,349,782 B1 | 2/2002 | Sekiya et al. | |
| 6,357,769 B1 | 3/2002 | Omundson et al. | |
| 6,428,027 B1 | 8/2002 | Stuart | |
| 6,789,812 B2 | 9/2004 | Peterson | |
| 6,840,525 B1 | 1/2005 | Griffiths | |
| 6,866,295 B2 | 3/2005 | Ziech et al. | |
| 7,464,779 B2 | 12/2008 | Grabmaier et al. | |
| 7,819,411 B2 | 10/2010 | Eshelman et al. | |
| 7,971,890 B2 | 7/2011 | Richardson | |
| 8,402,878 B2 | 3/2013 | Schreiner et al. | |
| 8,579,308 B2 | 11/2013 | Weeks et al. | |
| 8,640,801 B2 | 2/2014 | Hennings et al. | |
| 8,678,118 B2 | 3/2014 | Takenaka et al. | |
| 8,960,341 B2 | 2/2015 | Weber | |
| 9,221,494 B2 | 12/2015 | Hestermeyer et al. | |
| 9,221,496 B2 | 12/2015 | Barr et al. | |
| 9,266,423 B2 | 2/2016 | Hoshinoya et al. | |
| 9,533,711 B2 | 1/2017 | Hirsch et al. | |
| D814,979 S | 4/2018 | Cantuern et al. | |
| 10,266,025 B2 * | 4/2019 | Lorenz | B60G 7/008 |
| 10,435,075 B2 * | 10/2019 | Lorenz | B60G 7/008 |
| 2002/0163174 A1 | 11/2002 | Bell et al. | |
| 2003/0064846 A1 | 4/2003 | Klemen et al. | |
| 2003/0098564 A1 | 5/2003 | VanDenberg et al. | |
| 2003/0122340 A1 * | 7/2003 | Varela | B60G 3/20 280/124.135 |
| 2004/0150142 A1 | 8/2004 | Warinner et al. | |
| 2004/0183271 A1 | 9/2004 | Galazin et al. | |
| 2006/0192361 A1 | 8/2006 | Anderson et al. | |
| 2006/0208447 A1 | 9/2006 | Eshelman et al. | |
| 2007/0259747 A1 | 11/2007 | Thomas et al. | |
| 2008/0179116 A1 | 7/2008 | Ikenoya et al. | |
| 2008/0315546 A1 | 12/2008 | Kucinski et al. | |
| 2009/0014223 A1 | 1/2009 | Jones et al. | |
| 2009/0057050 A1 | 3/2009 | Shino et al. | |
| 2010/0025131 A1 | 2/2010 | Gloceri et al. | |
| 2010/0038877 A1 | 2/2010 | Cortez et al. | |
| 2010/0117318 A1 | 5/2010 | Grozev et al. | |
| 2010/0276901 A1 | 11/2010 | Richardson et al. | |
| 2011/0214947 A1 | 9/2011 | Tuomas | |
| 2013/0175779 A1 | 7/2013 | Kvien et al. | |
| 2014/0182954 A1 | 7/2014 | Weber | |
| 2014/0327220 A1 | 11/2014 | Holt et al. | |
| 2015/0266373 A1 | 9/2015 | Wang | |
| 2016/0076610 A1 | 3/2016 | White et al. | |
| 2017/0305221 A1 * | 10/2017 | Schmidt | B60G 7/001 |
| 2017/0320365 A1 | 11/2017 | Lorenz et al. | |
| 2017/0320366 A1 | 11/2017 | Milton et al. | |
| 2017/0320367 A1 | 11/2017 | Milton et al. | |
| 2017/0320382 A1 | 11/2017 | Milton et al. | |
| 2017/0320522 A1 | 11/2017 | Lorenz et al. | |
| 2018/0237070 A1 | 8/2018 | Lorenz et al. | |

FOREIGN PATENT DOCUMENTS

| | | | |
|---|---|---|---|
| DE | 3136305 A1 | 3/1983 | |
| DE | 19860230 A1 | 2/2000 | |
| DE | 102011084858 A1 | 4/2013 | |
| DE | 212013000235 U1 | 7/2015 | |
| DE | 212013000235 U1 * | 7/2015 | B60G 3/20 |
| DE | 10 2015 203110 A1 | 8/2016 | |
| EP | 0931684 A1 | 7/1999 | |
| EP | 0742113 B1 | 10/2001 | |
| EP | 1724130 A1 | 11/2006 | |
| EP | 1900554 B1 | 11/2011 | |
| EP | 1628854 B1 | 7/2012 | |
| EP | 2 990 239 A1 | 3/2016 | |
| EP | 2990239 A1 * | 3/2016 | B60G 15/12 |
| EP | 3241692 A1 * | 11/2017 | B60G 11/27 |
| EP | 3 290 298 A1 | 3/2018 | |
| EP | 3290298 B1 * | 3/2020 | B62D 7/18 |
| JP | H0664419 A | 3/1994 | |
| WO | 0123245 A1 | 4/2001 | |
| WO | 200151300 A1 | 7/2001 | |
| WO | 2015110965 A2 | 7/2015 | |
| WO | 2017196633 A1 | 11/2017 | |
| WO | 2017196776 A1 | 11/2017 | |
| WO | 2017196778 A1 | 11/2017 | |
| WO | 2018039106 A1 | 3/2018 | |

OTHER PUBLICATIONS

ZF Friedrichshafen AG, Independent Front Suspension RL 82 EC, printed from the Internet on Feb. 4, 2019 <<https://www.zf.com/products/en/buses/products_39877.html[Feb. 4, 2019 6:18:29 PM]>>.

Reyco Granning Suspensions, Motorhome Suspensions Owner's Manual, IFS1460S2—Independent Front Suspension, ISO 9001: 2008 Certified, Document #: 0705947, Revision K, Revision Date: May 2012, 65 pages, <<www.reycogranning.com>>, Mount Vernon, MO.

Lorenz, et al., U.S. Appl. No. 16/288,256, filed with the U.S. Patent and Trademark Office, filed Feb. 28, 2019.

Lorenz, et al., U.S. Appl. No. 16/291,462, filed with the U.S. Patent and Trademark Office, filed Mar. 4, 2019.

* cited by examiner

SUSPENSION SYSTEM

TECHNICAL FIELD

This disclosure relates to a suspension system having a knuckle. The knuckle may include a toe link mount, a stabilizer bar mount, a brake torque plate, or combinations thereof.

BACKGROUND

A suspension module is disclosed in U.S. Patent Publication No. 2017/0320365.

SUMMARY

In at least one embodiment a suspension system is provided. The suspension system may include a knuckle that rotatably supports a wheel end assembly. The knuckle may include a first platform that may support a first air spring and may have a toe link mount. Alternatively or in addition, the knuckle may include a second platform that supports a second air spring and has a stabilizer bar mount.

In at least one embodiment a suspension system is provided. The suspension system may include a knuckle that may rotatably support a wheel end assembly. The knuckle may include a first platform, a second platform, an upper control arm mount, a spindle mount, and a brake torque plate. The first platform may support a first air spring. The second platform may support a second air spring. The upper control arm mount may be disposed between the first platform and the second platform. The spindle mount may be disposed below the upper control arm mount. At least a portion of the brake torque plate may extend from the spindle mount toward the upper control arm mount. A brake subsystem may be mounted to the brake torque plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
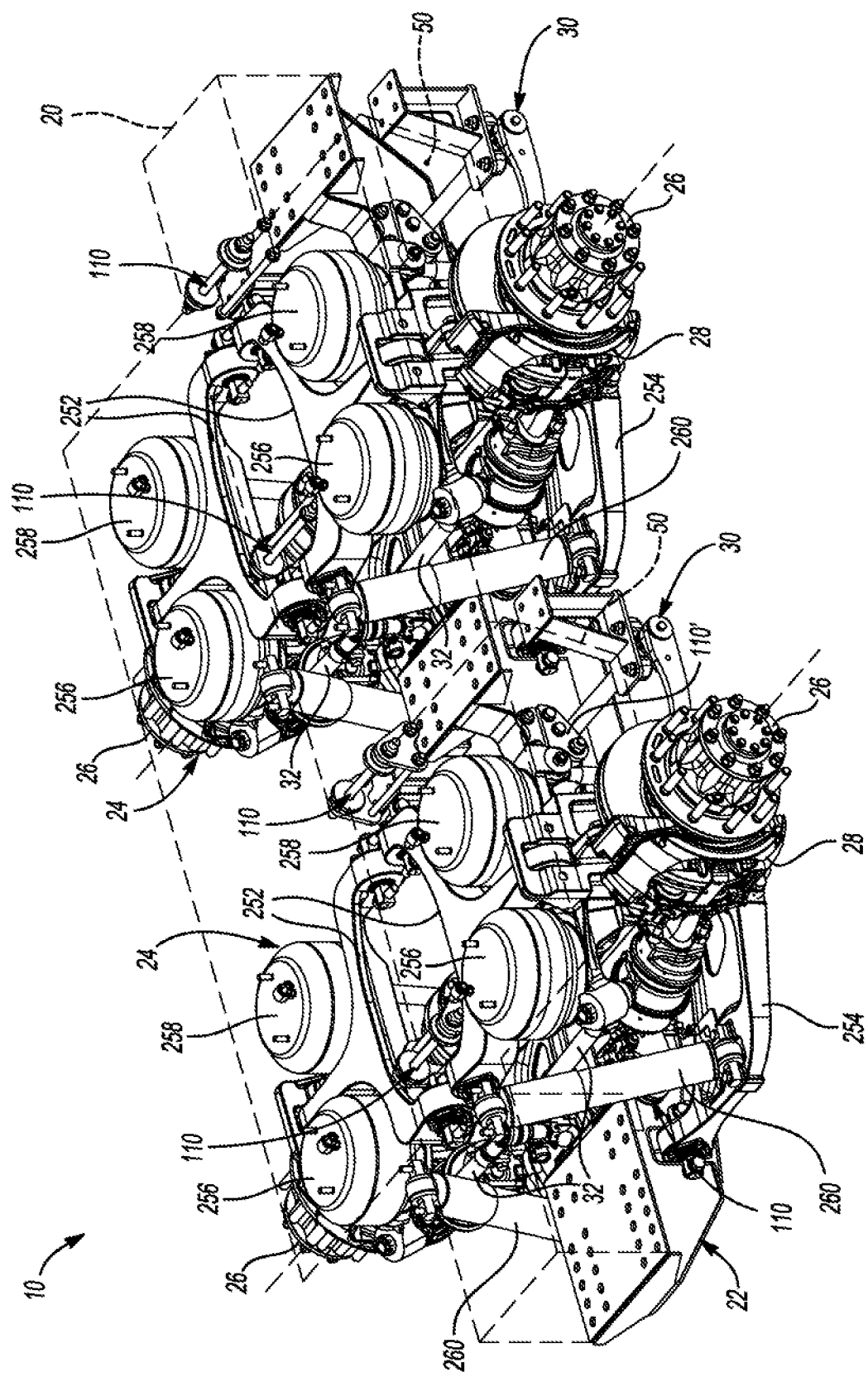
FIG. 1 is a perspective view of a portion of a vehicle that has an assembly that includes a skid plate module and a suspension system.

Referring to FIG. 1, a portion of a vehicle 10 is shown. The vehicle 10 may be a motor vehicle like a truck, bus, farm equipment, military transport or weaponry vehicle, or cargo loading equipment for land, air, or marine vessels. The vehicle 10 may include a chassis 20, a skid plate module 22, a suspension system 24, a wheel end assembly 26, a brake subsystem 28, a stabilizer bar subassembly 30, and a toe link 32.

Figure 3:
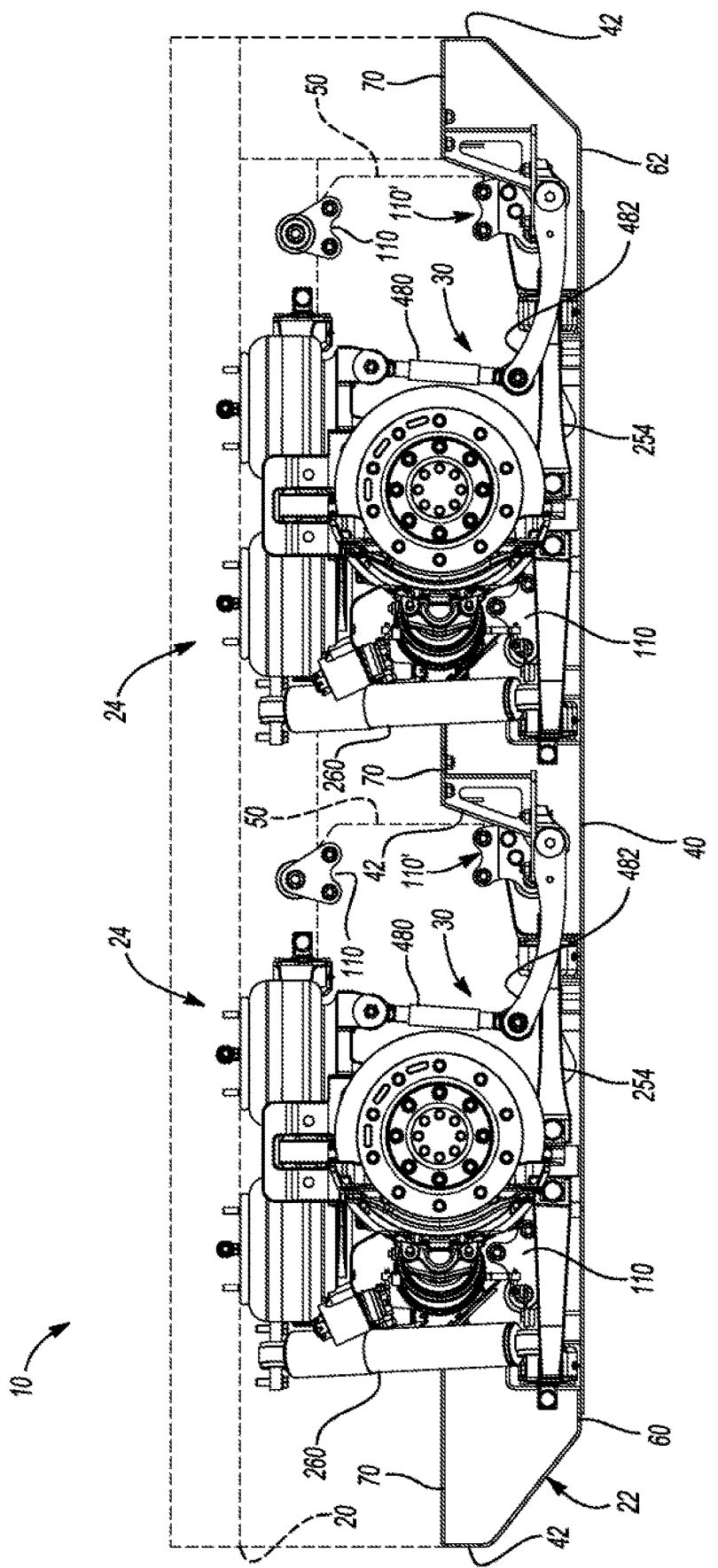
FIG. 3 is a side view of the assembly of FIGS. 1 and 2.
Figure 4:
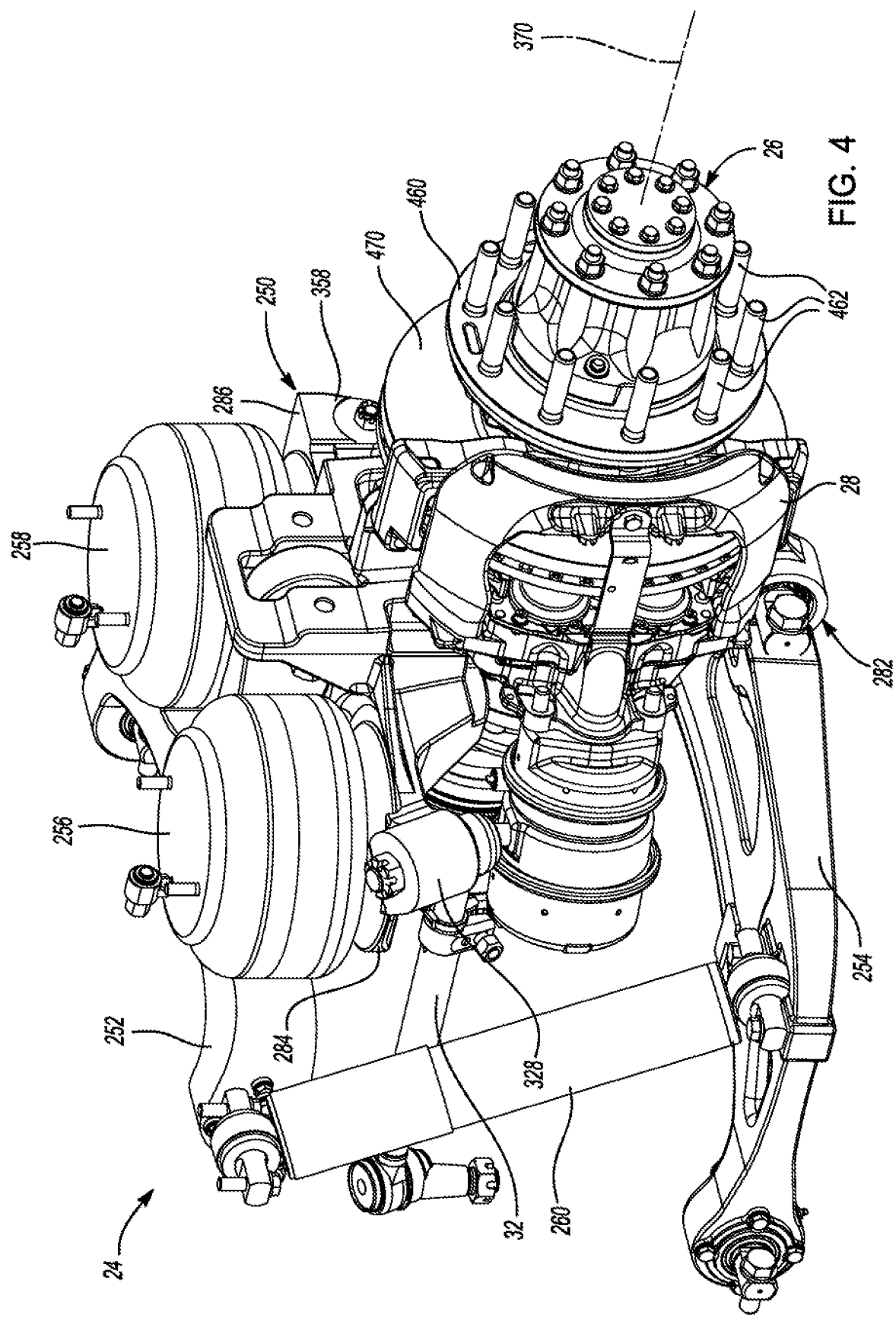
FIGS. 4 and 5 are perspective views of a portion of the suspension system.

Referring to FIGS. 1 and 3, the chassis 20 may be the structural framework of the vehicle 10. In at least one configuration, the chassis 20 may include frame rails that may extend between the front and rear of the vehicle 10 and components such as cross rails that may interconnect the frame rails. The chassis 20 may also facilitate mounting of the suspension system 24 to the vehicle 10. The chassis 20 may not include body panels of the vehicle 10, such as doors, fenders, hood, roof panel, or the like. The chassis 20 is shown in phantom in FIGS. 1 and 3 to allow other features of the vehicle 10 to be better illustrated.

Figure 9:
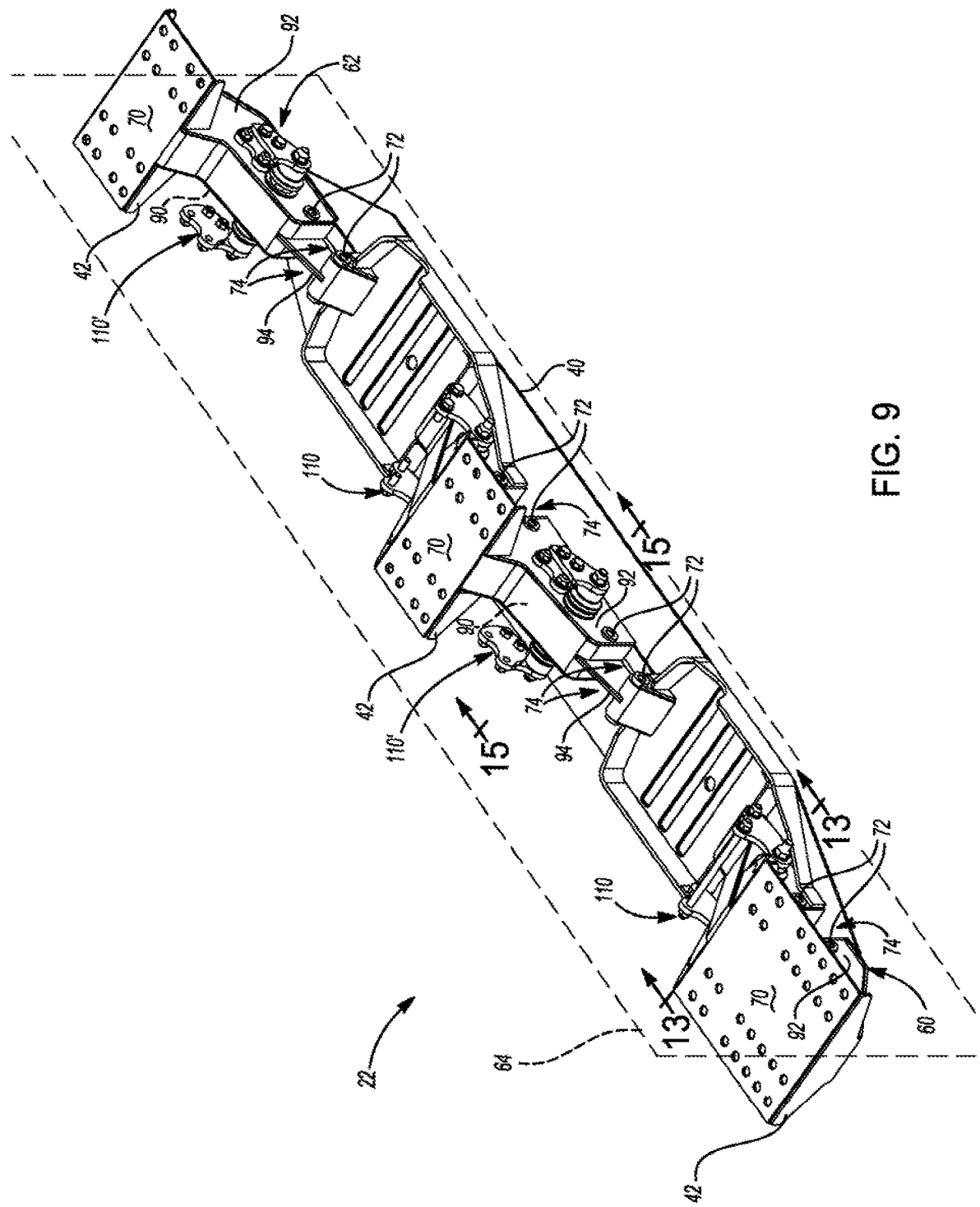
FIG. 9 is a perspective view of the skid plate module and mounting bracket subassemblies.

Referring to FIGS. 3 and 9, the skid plate module 22 may be configured to be mounted to the chassis 20. For example, the skid plate module 22 may be located underneath the chassis 20 and may be fixedly disposed on or fixedly mounted to the chassis 20. As such, the skid plate module 22 may extend along or may at least partially define the underside of the vehicle 10. In addition, the skid plate module 22 may facilitate mounting of the suspension system 24 or a portion thereof as will be discussed in more detail below. The skid plate module 22 may be a load carrying assembly that may help stiffen the chassis 20 and may help provide the structural framework of the vehicle 10. In at least one configuration, the skid plate module 22 may include skid plate 40, and one or more pillars 42.

The skid plate 40 may be disposed at the bottom of the skid plate module 22. In addition, the skid plate 40 may be spaced apart from the chassis 20. The skid plate 40 may help protect various components of the vehicle 10 from damage. For instance, the skid plate 40 may help protect one or more components of a vehicle drivetrain from damage, such as may be caused by "grounding out" or hitting an object under the vehicle 10, such as rocks, curbs, the road surface, or the like. A drivetrain component 50 may be associated with propulsion of the vehicle 10. For example, a drivetrain component 50 may be a power source like a battery, engine, motor (including but not limited to an electric motor) or may be a torque transmission component like a transmission, gearbox, transfer case, axle assembly, differential, or the like. The skid plate 40 may be made of any suitable material, such as a metal or metal alloy. In at least one configuration, the skid plate 40 may be substantially flat or planar and may include a first end 60 and a second end 62.

The first end 60 of the skid plate 40 may be positioned closest to the front of the vehicle 10.

The second end 62 of the skid plate 40 may be disposed opposite the first end 60. As such, the second end 62 of the skid plate 40 may be positioned closest to the rear of the vehicle 10.

Referring to FIG. 9, a center plane 64 may extend from the first end 60 to the second end 62. The center plane 64 may extend vertically and may be disposed substantially perpendicular to the skid plate 40. In addition, the center plane 64 may be disposed along a center axis of the vehicle 10. The center plane 64 may be disposed proximate the center of the skid plate module 22. For instance, the center plane 64 may bisect the skid plate 40 or one or more pillars 42 such that the skid plate 40 or one or more pillars 42 may have mirror symmetry with respect to the center plane 64.

Figure 10:
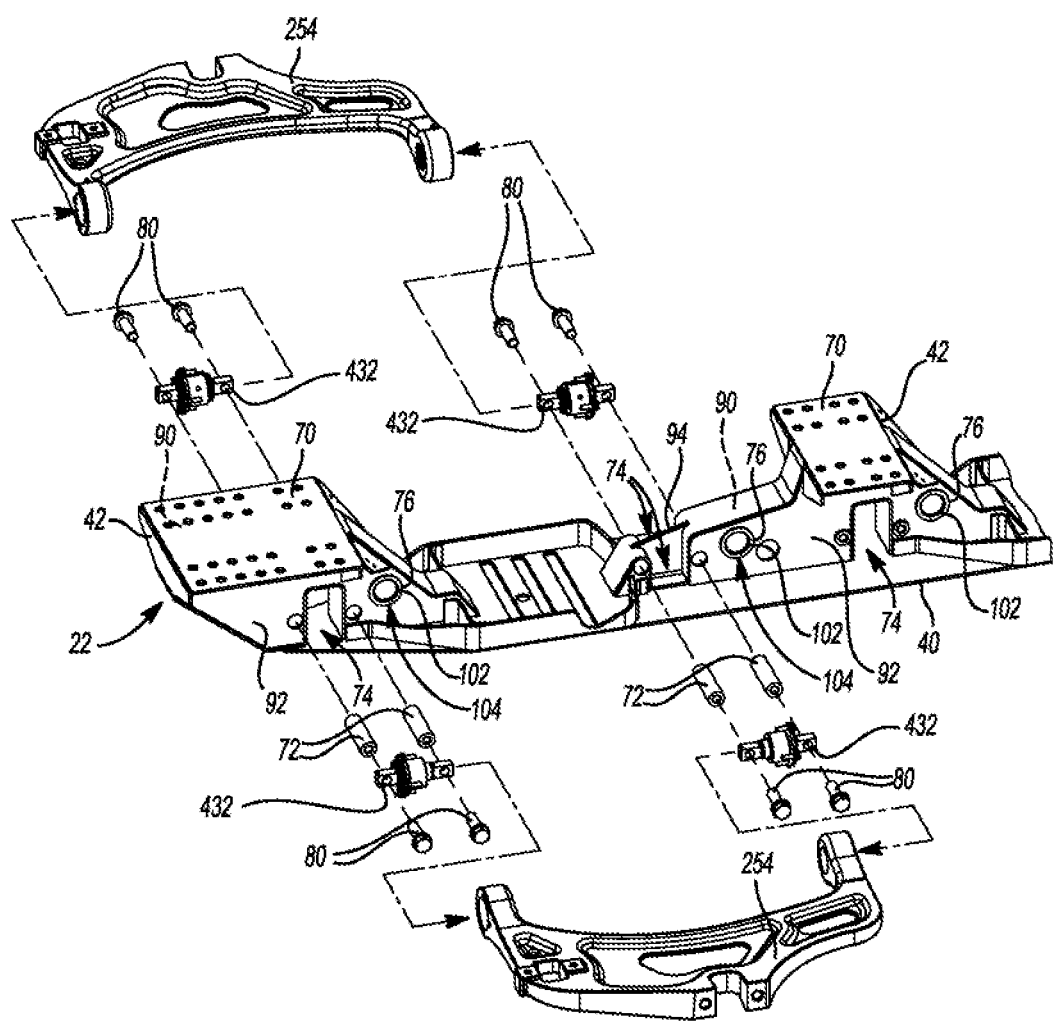
FIG. 10 is an exploded view that shows a portion of the skid plate module and components associated with mounting lower control arms to the skid plate module.

Referring to FIGS. 3, 9 and 10, one or more pillars 42 may extend from the skid plate 40 to the chassis 20. As such, a pillar 42 may extend in a generally vertical direction from the skid plate 40 to the chassis 20. In the configuration shown, three pillars 42 are provided; however, it is contemplated that a greater or lesser number of pillars 42 may be provided. For convenience in reference, the three pillars may be referred to as a first pillar, a second pillar, and a third pillar. The first pillar may be disposed at or closest to the first end 60 of the skid plate 40. The second pillar may be disposed rearward of the first pillar along the center plane 64 and may be located between the first pillar and the third pillar. The third pillar may be disposed at or closest to the second end 62 of the skid plate 40. The pillars 42 may be spaced apart from each other and may be arranged along the center plane 64. In at least one configuration, a pillar 42 may include a mounting plate 70, one or more mounting sleeves 72, one or more recesses 74, and one or more tubes 76.

A mounting plate 70 may facilitate mounting of a pillar 42 to the chassis 20. For example, a mounting plate 70 may be disposed at an opposite end of a pillar 42 from the skid plate 40 and may be coupled to the chassis 20 in any suitable manner. For instance, the mounting plate 70 may be welded to the chassis 20 or may have a plurality of holes that may receive fasteners, such as bolts, rivets, or the like, that may attach the mounting plate 70 to the chassis 20.

Referring to FIGS. 9 and 10, a mounting sleeve 72 may be provided with a pillar 42 to facilitate mounting of a lower control arm as will be discussed in more detail below. In at least one configuration, a mounting sleeve 72 may be configured as a hollow cylindrical tube that may have a threaded hole that may be configured to receive a fastener 80, such as bolt, that may couple a lower control arm to the mounting sleeve 72. The mounting sleeve 72 may be fixedly disposed on a pillar 42 or fixedly positioned with respect to a pillar 42.

A mounting sleeve 72 may extend through a pillar 42, such as from a first lateral side 90 of a pillar 42 to a second lateral side 92 of the pillar 42. The first lateral side 90 and the second lateral side 92 may define opposing sides of the pillar 42 and may be disposed on opposite sides of the center plane 64. For instance, the first lateral side 90 may face toward the left side of the vehicle 10 when viewed from a position in front of the vehicle 10 while the second lateral side 92 may face toward the right side of the vehicle 10 when viewed from a position in front of the vehicle 10. The center plane 64 may intersect and may bisect a mounting sleeve 72 that extends from a first lateral side 90 to a second lateral side 92.

One or more mounting sleeves 72 may be provided with a pillar 42. In the configuration shown in FIG. 9, a pair of mounting sleeves 72 is provided with the first pillar and the third pillar while four mounting sleeves are provided with the second pillar, however, it is contemplated that a greater or lesser number of mounting sleeves 72 may be provided. For instance, it is contemplated that separate spaced apart mounting sleeves may be provided with the first lateral side 90 and the second lateral side 92 of a pillar 42 rather than providing mounting sleeves 72 that extend from the first lateral side 90 to the second lateral side 92.

Referring to FIGS. 9 and 10, one or more recesses 74 may be provided with a pillar 42 to facilitate pivotal movement of a lower control arm 254. For example, a recess 74 may be configured to partially receive at least one lower control arm 254 and may be sized to facilitate rotation or pivoting of the lower control arm 254 about an axis. In at least one configuration, a recess 74 may extend upward from the skid plate 40 and optionally may be partially defined by or bounded by the skid plate 40. In addition, a recess 74 may be positioned in a longitudinal direction or in a direction that extends along the center plane 64 between a pair of mounting sleeves 72. For instance, each recess 74 may be longitudinally centered between a pair of mounting sleeves 72 that may be disposed on opposite sides of the recess 74.

A recess 74 may be provided in various configurations. For instance, a recess 74 may be configured as a through hole that may extend from the first lateral side 90 to the second lateral side 92 of a pillar 42. Examples of recesses 74 having a through hole configuration is shown with the first pillar and with the recess located directly under the mounting plate 70 of the second pillar. In such a configuration, the recess 74 may partially receive two lower control arms, such as a first lower control arm 254 that that may be disposed proximate the first lateral side 90 and a second lower control arm 254 that may be disposed proximate the second lateral side 92.

Alternatively, a recess 74 may not be configured as a through hole but instead may extend from a lateral side to an intervening feature or member, such as a web 94. Examples of recesses 74 that are partially defined by a web 94 are shown with the second pillar (to the left of its mounting plate 70) and with the third pillar, which is shown in FIG. 9. A web 94 may extend upward and away from the skid plate 40 and may effectively separate a through hole recess into separate opposing recesses. As such, a recess 74 may extend from the first lateral side 90 of a pillar 42 to the web 94 while an opposing recess 74 may extend from the second lateral side 92 to the web 94. In addition, the web 94 may be disposed along the center plane 64. In such configurations, each recess 74 may partially receive different lower control arms 254.

Figure 13:
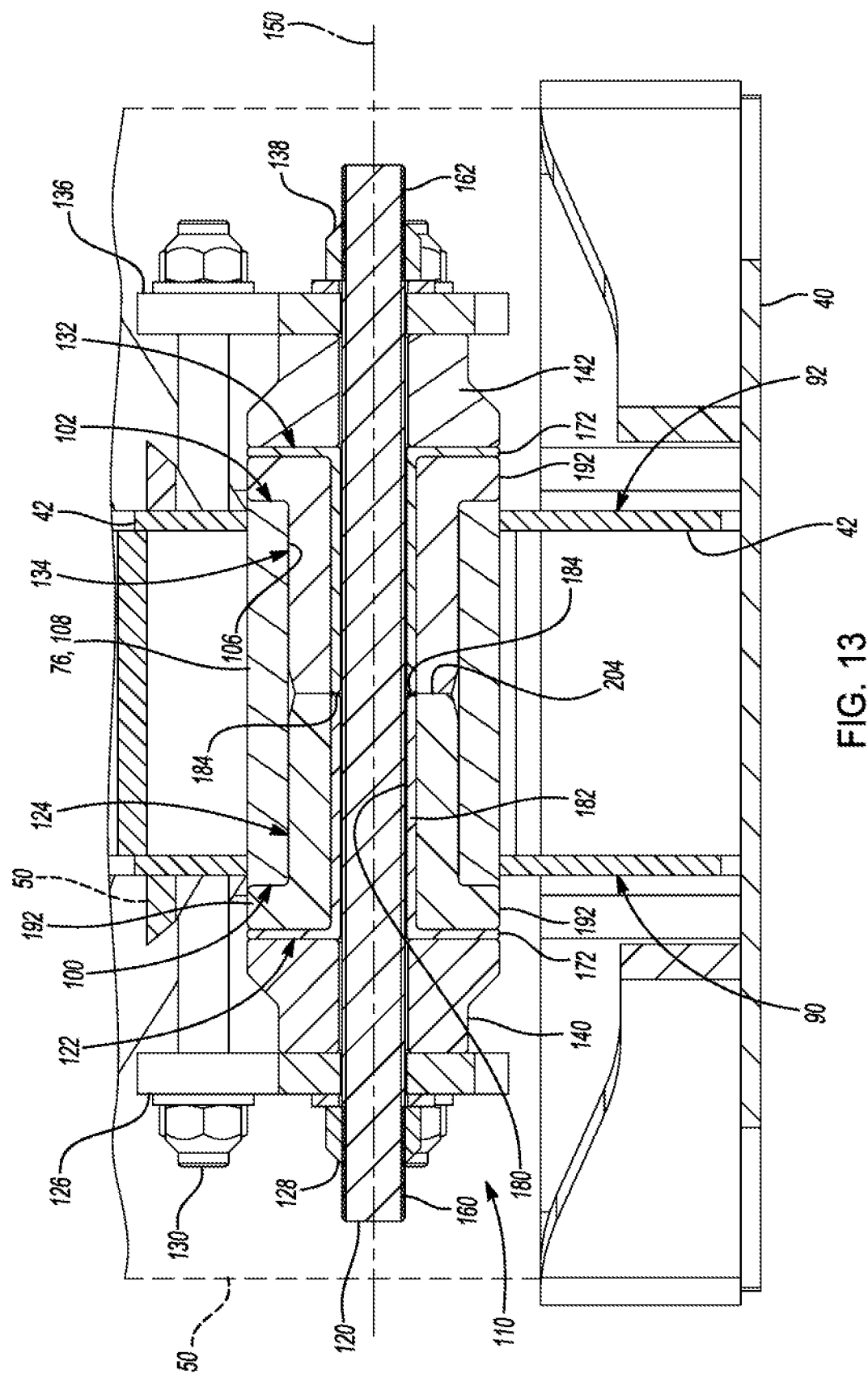
FIG. 13 is a section view along section line 13-13.

Referring to FIGS. 10 and 13, a tube 76 may be provided with a pillar 42 to facilitate mounting of a mounting bracket assembly as will be discussed in more detail below. In at least one configuration, a tube 76 may be configured as a hollow cylindrical tube that may be configured to receive a mounting bracket assembly that may couple a drivetrain component 50 to the skid plate module 22. A tube 76 may extend at least partially through a pillar 42 and may be fixedly mounted on a pillar 42 or fixedly positioned with respect to a pillar 42. As is best shown in FIG. 10, a tube 76 may be positioned above the skid plate 40 and may be located further from or further above the skid plate 40 than the mounting sleeves 72. As such, a tube 76 may be located above a pivot axis of a lower control arm 254 as will be discussed in more detail below.

One or more tubes 76 may be provided with a pillar 42. In the configuration shown in FIG. 10, one tube 76 is provided with the first pillar and the third pillar while two tubes 76 are provided with the second pillar; however, it is contemplated that a greater or lesser number of tubes 76 may be provided. For instance, it is contemplated that a single tube 76 may be provided with the second pillar in a configuration where the third pillar may be omitted.

Referring to FIGS. 10 and 13, the tube 76 may include a first tube end surface 100, a second tube end surface 102, a tube hole 104, an inner tube surface 106, and an outer tube surface 108.

The first tube end surface 100 may be disposed proximate the first lateral side 90 of a pillar 42. Optionally, the first tube end surface 100 may protrude from the first lateral side 90.

The second tube end surface 102 may be disposed opposite the first tube end surface 100. As such, the second tube end surface 102 may be disposed proximate the second lateral side 92 of the pillar 42. Optionally, the second tube end surface 102 may protrude from the second lateral side 92.

The tube hole 104, which is best shown in FIG. 10, may extend from the first tube end surface 100 to the second tube end surface 102. The tube hole 104 may be substantially cylindrical.

The inner tube surface 106, which is best shown in FIG. 13, may extend from the first tube end surface 100 to the second tube end surface 102. The inner tube surface 106 may define the tube hole 104.

The outer tube surface 108 may extend from the first tube end surface 100 to the second tube end surface 102. In addition, the outer tube surface 108 may be disposed opposite and may face away from the tube hole 104 and the inner tube surface 106. The outer tube surface 108 may engage the pillar 42 and may be fixedly coupled to the pillar 42.

Referring to FIGS. 3 and 9, one or more mounting bracket subassemblies 110, 110' may be provided to mount a drivetrain component 50 to the chassis 20, the skid plate module 22, or both. In the configuration shown, four mounting bracket subassemblies are associated with each drivetrain component 50; however, it is contemplated that a greater or lesser number of mounting bracket subassemblies 110, 110' may be provided.

Figure 11:
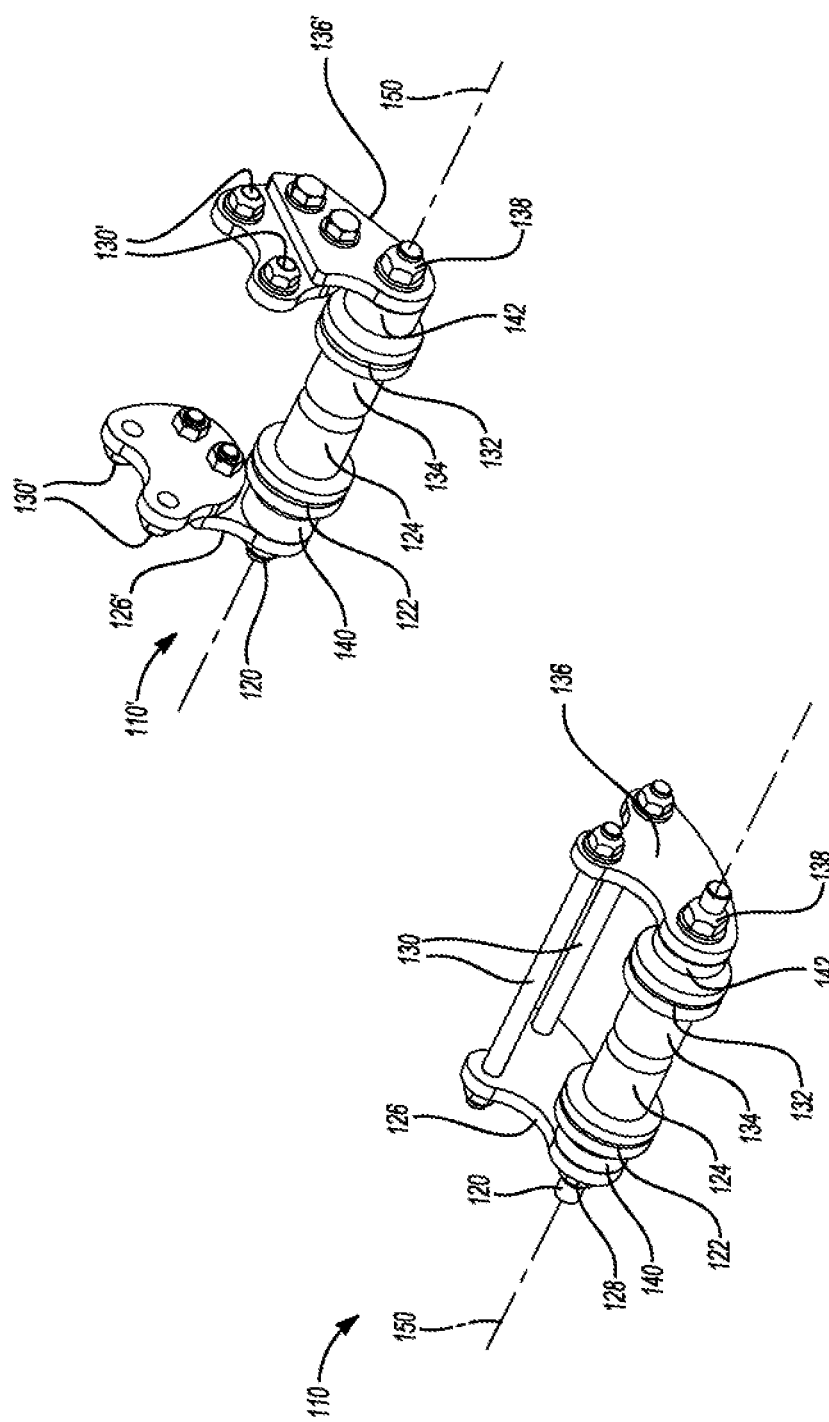
FIG. 11 is a perspective view that shows first and second mounting bracket subassemblies.

Referring to FIGS. 3, 9 and 11, the mounting bracket subassemblies 110, 110' may be provided with a common configuration or with multiple configurations. In these Figures, two different mounting bracket subassembly configurations are shown and are designated with reference numbers 110 and 110', respectively. Either mounting bracket subassembly 110, 110' may be used to couple a drivetrain component 50 to the chassis 20 or to the skid plate module 22 depending on the configuration of the drivetrain component 50. As one nonlimiting example which is best shown with reference to FIGS. 3 and 9, two mounting bracket subassemblies 110 may couple the drivetrain component 50 to the chassis 20, one mounting bracket subassembly 110 may couple the drivetrain component 50 to a pillar 42, and one mounting bracket subassembly 110' may couple the drivetrain component 50 to another pillar 42. For convenience in reference, the mounting bracket subassembly 110 may also be referred to as a first mounting bracket subassembly to help distinguish from mounting bracket subassembly 110'.

Figure 12:
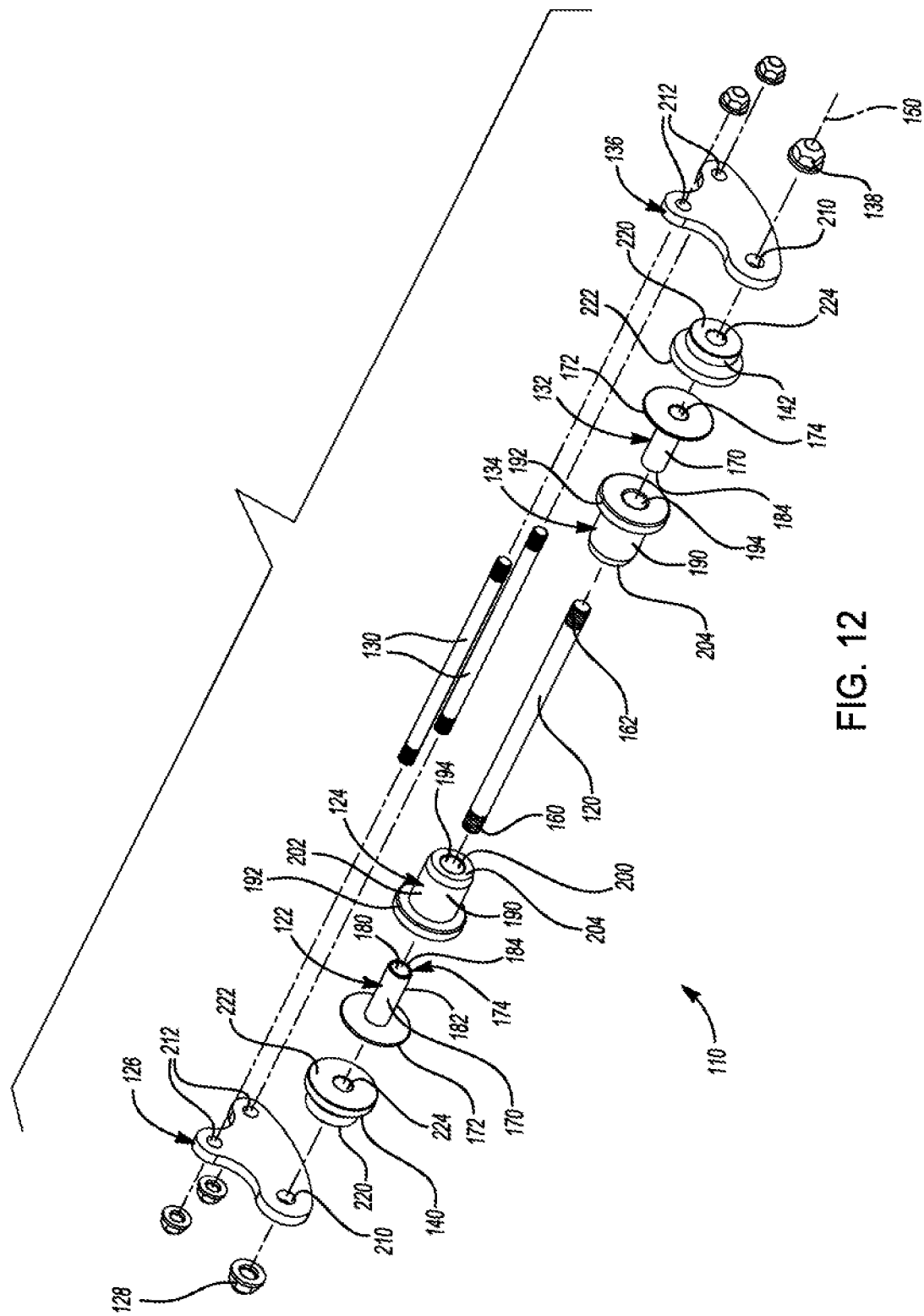
FIG. 12 is an exploded view of the first mounting bracket subassembly.

Referring to FIGS. 11-13, the mounting bracket subassembly 110 is shown in more detail. The mounting bracket subassembly 110 may include a rod 120, a first sleeve 122, a first bushing 124, a first mounting plate 126, a first nut 128, and one or more fasteners 130. The mounting bracket subassembly 110 may also include a second sleeve 132, a second bushing 134, a second mounting plate 136, and a second nut 138. Optionally, the mounting bracket subassembly 110 may include one or more spacers, such as a first spacer 140 and a second spacer 142.

Referring primarily to FIG. 13, the rod 120 may be at least partially disposed in the tube 76 of a pillar 42. For example, the rod 120 may extend along a rod axis 150 and main extend completely through the tube 76 such that the ends of the rod 120 protrude from the tube 76. Referring to FIGS. 12 and 13, the rod 120 may include a first threaded portion 160 and a second threaded portion 162. The first threaded portion 160 may extend from a first end of the rod 120. The second threaded portion 162 may extend from a second end of the rod 120 that may be disposed opposite the first end. The rod 120 may be substantially cylindrical between the first end and the second end.

The first sleeve 122 may receive the rod 120. The first sleeve 122 may be made of a stiffer or less flexible material than the first bushing 124, such as a metal or metal alloy. In at least one configuration, the first sleeve 122 may include a sleeve body 170, a sleeve flange 172, and a sleeve hole 174.

The sleeve body 170 may have a hollow tubular or cylindrical configuration in one or more embodiments. The sleeve body 170 may extend around the rod 120 and may be at least partially disposed in the tube 76. In at least one configuration, the sleeve body 170 may have an inner sleeve body surface 180, an outer sleeve body surface 182, and a sleeve end surface 184.

The inner sleeve body surface 180 may extend from the sleeve flange 172 to the sleeve end surface 184. The inner sleeve body surface 180 may face toward and may engage the rod 120.

The outer sleeve body surface 182 may extend from the sleeve flange 172 to the sleeve end surface 184. The outer sleeve body surface 182 may be disposed opposite the inner sleeve body surface 180 and may face away from the rod 120.

The sleeve end surface 184 may be disposed at an end of the sleeve body 170 that may be disposed opposite the sleeve flange 172. The sleeve end surface 184 may extend from the inner sleeve body surface 180 to the outer sleeve body surface 182.

The sleeve flange 172 may extend from an end of the sleeve body 170. For example, the sleeve flange 172 may extend from an end of the sleeve body 170 that may be disposed opposite the sleeve end surface 184 and may extend away from the rod axis 150. The sleeve flange 172 may be disposed substantially perpendicular to the rod axis 150, the inner sleeve body surface 180, the outer sleeve body surface 182, or combinations thereof. In addition, the sleeve flange 172 may be disposed outside the tube 76.

The sleeve hole 174 may be defined by the sleeve body 170 and the sleeve flange 172. For example, the sleeve hole 174 may be at least partially defined by the inner sleeve body surface 180. The rod 120 may extend through the sleeve hole 174.

The first bushing 124 may receive the first sleeve 122. The first bushing 124 may be made of a more resilient or more compressible material than the first sleeve 122. For instance, the first bushing 124 may be made of rubber or a similar material. In at least one configuration, the first bushing 124 may include a bushing body 190, a bushing flange 192, and a bushing hole 194.

The bushing body 190 may have a hollow tubular or cylindrical configuration in one or more embodiments. The bushing body 190 may extend around the sleeve body 170 and may be completely disposed in the tube 76. In at least one configuration, the bushing body 190 may have an inner bushing body surface 200, an outer bushing body surface 202, and a bushing end surface 204.

The inner bushing body surface 200 may extend from the bushing flange 192 to the bushing end surface 204. The inner bushing body surface 200 may face toward and may engage the outer sleeve body surface 182.

The outer bushing body surface 202 may extend from the bushing flange 192 to the bushing end surface 204. The outer bushing body surface 202 may be disposed opposite the inner bushing body surface 200 and may face toward and may engage the inner tube surface 106 of the tube 76.

The bushing end surface 204 may be disposed at an end of the bushing body 190 that may be disposed opposite the bushing flange 192. The bushing end surface 204 may extend from the inner bushing body surface 200 to the outer bushing body surface 202.

The bushing flange 192 may extend from an end of the bushing body 190. For example, the bushing flange 192 may extend from an end of the bushing body 190 that may be disposed opposite the bushing end surface 204 and may extend away from the rod 120 and the rod axis 150. The bushing flange 192 may extend substantially perpendicular to the rod axis 150, the inner bushing body surface 200, the outer bushing body surface 202, or combinations thereof. In addition, the bushing flange 192 may be disposed outside the tube 76 and may be axially positioned or positioned along the rod axis 150 between the first tube end surface 100 and the sleeve flange 172. Moreover, the bushing flange 192 may engage or contact the first tube end surface 100 and the sleeve flange 172.

The bushing hole 194 may be defined by the bushing body 190 and the bushing flange 192. For example, the bushing hole 194 may be at least partially defined by the inner bushing body surface 200. The sleeve body 170 may extend at least partially through the bushing hole 194.

The first mounting plate 126 may extend from the rod 120 and may be operatively connected to the drivetrain component 50. The first mounting plate 126 may be axially positioned between the first nut 128 and the first sleeve 122. Moreover, the first mounting plate 126 may be axially positioned between the first nut 128 and the first spacer 140, if provided. In at least one configuration, the first mounting plate 126 may include a rod hole 210 and one or more fastener holes 212. The rod 120 may extend through the rod hole 210. A fastener 130 may extend through the fastener hole 212. In the configuration shown, two fastener holes 212 are provided.

The first nut 128 may help secure components of the mounting bracket subassembly 110. The first nut 128 may engage a side of the first mounting plate 126 that may face away from the tube 76. The first nut 128 may have a threaded hole that may receive and mate with the first threaded portion 160 of the rod 120. The first bushing 124 may be axially compressed against the first tube end surface 100 of the tube 76 when the first nut 128 is tightened. More specifically, tightening the first nut 128 may exert pressure on the first mounting plate 126, the first spacer 140 if provided, the first sleeve 122, and the first bushing 124. This pressure may be resisted by the tube 76, which is fixed to the skid plate module 22.

One or more fasteners 130 may be provided to attach the first mounting plate 126 to the drivetrain component 50. A fastener 130 may be received in a fastener hole 212 of the first mounting plate 126 and may extend to the drivetrain component 50. The fasteners 130 may have any suitable configuration. For instance, the fasteners 130 may have a similar configuration as the rod 120 and may extend through fastener holes 212 in the first mounting plate 126 and the second mounting plate 136. Alternatively, a fastener 130 may be configured as a bolt and may extend through a single mounting plate to the drivetrain component 50.

The second sleeve 132 may have the same configuration as the first sleeve 122. Accordingly, the second sleeve 132 may receive the rod 120 and may have the same features as the first sleeve 122. The features of the second sleeve 132 are referenced with the same reference numbers as the corresponding feature of the first sleeve 122.

The second bushing 134 may have the same configuration as the first bushing 124. Accordingly, the second bushing 134 may receive the second sleeve 132, may be partially received in the tube 76, and may have the same features as the first bushing 124. The features of the second sleeve 132 are provided with the same reference numbers as the corresponding feature of the first sleeve 122. The bushing flange 192 of the second bushing 134 may be disposed outside the tube 76 and may be axially positioned or positioned along the rod axis 150 between the second tube end surface 102 and the sleeve flange 172 of the second bushing 134. Moreover, the bushing flange 192 of the second bushing 134 may engage or contact the second tube end surface 102 and the sleeve flange 172 of the second sleeve 132. The sleeve body 170 of the second sleeve 132 may extend at least partially through the bushing hole 194 of the second bushing 134.

The second mounting plate 136 may have the same configuration as the first mounting plate 126. Accordingly, the second mounting plate 136 may have the same features as the first mounting plate 126. The features of the second mounting plate 136 are provided with the same reference numbers as the corresponding feature of the first mounting plate 126.

The second mounting plate 136 may be axially positioned between the second nut 138 and the second sleeve 132. Moreover, the second mounting plate 136 may be axially positioned between the second nut 138 and the second spacer 142, if provided.

The second nut 138 may help secure components of the mounting bracket subassembly 110. The second nut 138 may engage a side of the second mounting plate 136 that may face away from the tube 76. The second nut 138 may have a threaded hole that may receive and mate with the second threaded portion 162 of the rod 120. The second bushing 134 may be axially compressed against the second tube end surface 102 of the tube 76 when the second nut 138 is tightened. More specifically, tightening the 138 may exert pressure on the second mounting plate 136, the second spacer 142 if provided, the second sleeve 132, and the second bushing 134. This pressure may be resisted by the tube 76, which is fixed to the skid plate module 22.

The first spacer 140, if provided, may receive the rod 120. The first spacer 140 may be made of a stiffer or less flexible material than the first bushing 124, such as a metal alloy or a polymeric material. In addition, the first spacer 140 may be axially positioned between the first sleeve 122 and the first mounting plate 126 and may extend from the first sleeve 122 to the first mounting plate 126. In at least one configuration, the first spacer 140 may include a first spacer end surface 220, a second spacer end surface 222, and a spacer hole 224.

The first spacer end surface 220 may face toward and may engage the first mounting plate 126.

The second spacer end surface 222 may be disposed opposite the first spacer end surface 220. As such, the second spacer end surface 222 may face toward and may engage the sleeve flange 172 of the first sleeve 122. The first spacer end surface 220 and the second spacer end surface 222 may be disposed substantially parallel to each other in one or more configurations.

The spacer hole 224 may extend from the first spacer end surface 220 to the second spacer end surface 222. The spacer hole 224 may receive the rod 120 and the rod 120 may engage the first spacer 140 in the spacer hole 224.

The second spacer 142, if provided, may have the same configuration as the first spacer 140. Accordingly, the second spacer 142 may have the same features as the first spacer 140. The features of the second spacer 142 are provided with the same reference numbers as the corresponding feature of the first spacer 140. The second spacer 142 may be axially positioned between the second sleeve 132 and the second mounting plate 136 and may extend from the second sleeve 132 to the second mounting plate 136. Accordingly, the first spacer end surface 220 of the second spacer 142 may face toward an may engage the second mounting plate 136 while the second spacer end surface 222 may face toward an may engage the sleeve flange 172 of the second sleeve 132.

The first sleeve 122 and the second sleeve 132 may cooperate to limit axial compression of the first bushing 124 and the second bushing 134. For instance, the first sleeve 122 and the second sleeve 132 may be actuatable toward each other or actuatable along the rod axis 150 when the sleeve end surface 184 of the first sleeve 122 is spaced apart from and does not engage the sleeve end surface 184 of the second sleeve 132. However, the first sleeve 122 and the second sleeve 132 are not actuatable toward each other when the sleeve end surface 184 of the first sleeve 122 contacts the sleeve end surface 184 of the second sleeve 132. As such, the first sleeve 122 and the second sleeve 132 may cooperate to prevent further axial compression of the first bushing 124 and the second bushing 134 when the sleeve end surfaces 184 contact each other. Thus, overtightening of the first nut 128 and the second nut 138 and potential damage to the first bushing 124 and the second bushing 134 may be prevented and the first sleeve 122 and the second sleeve 132 may cooperate to limit the axial load force or preload force that may be applied to the first bushing 124 and the second bushing 134.

Figure 14:
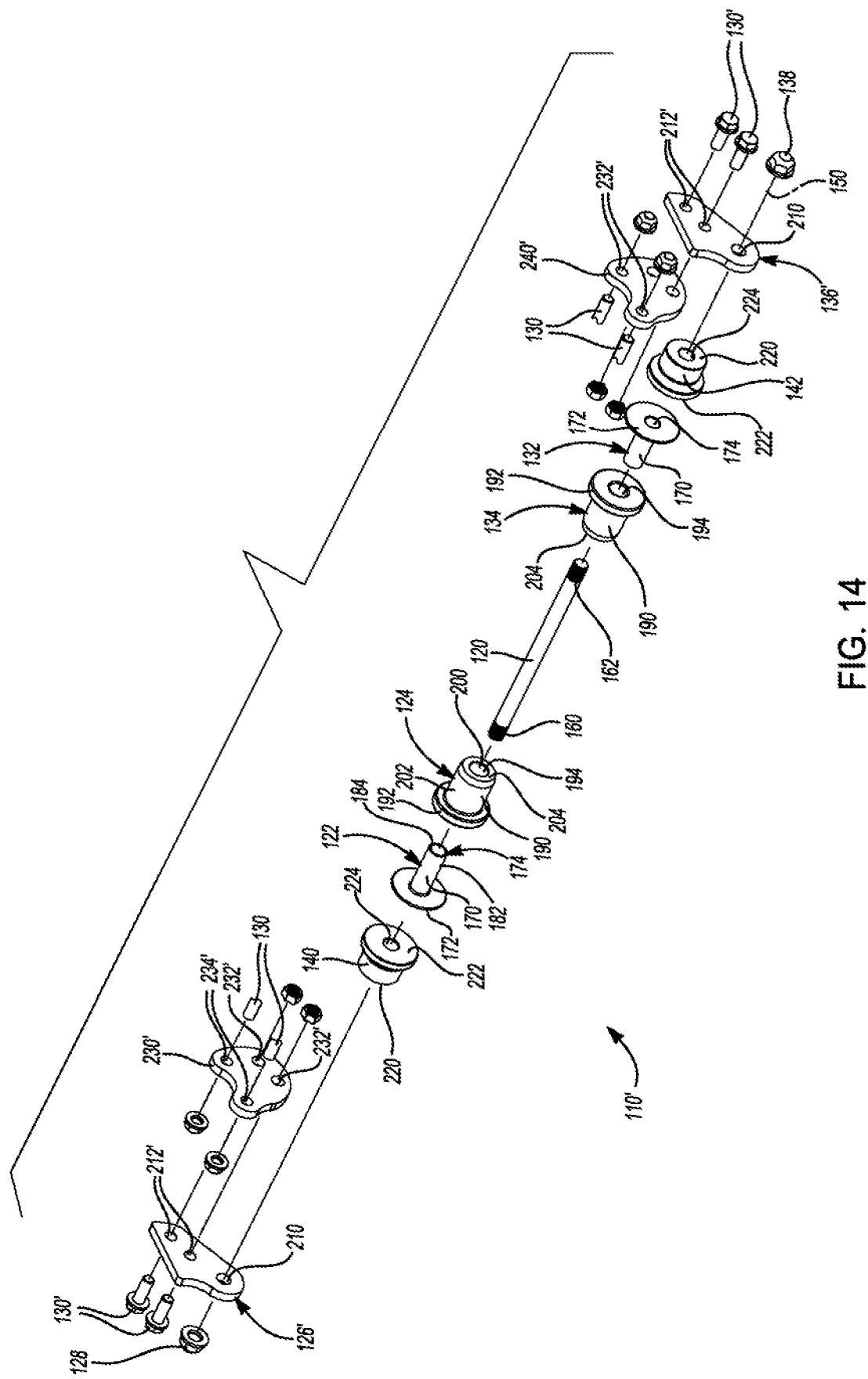
FIG. 14 is an exploded view of the second mounting bracket subassembly.
Figure 15:
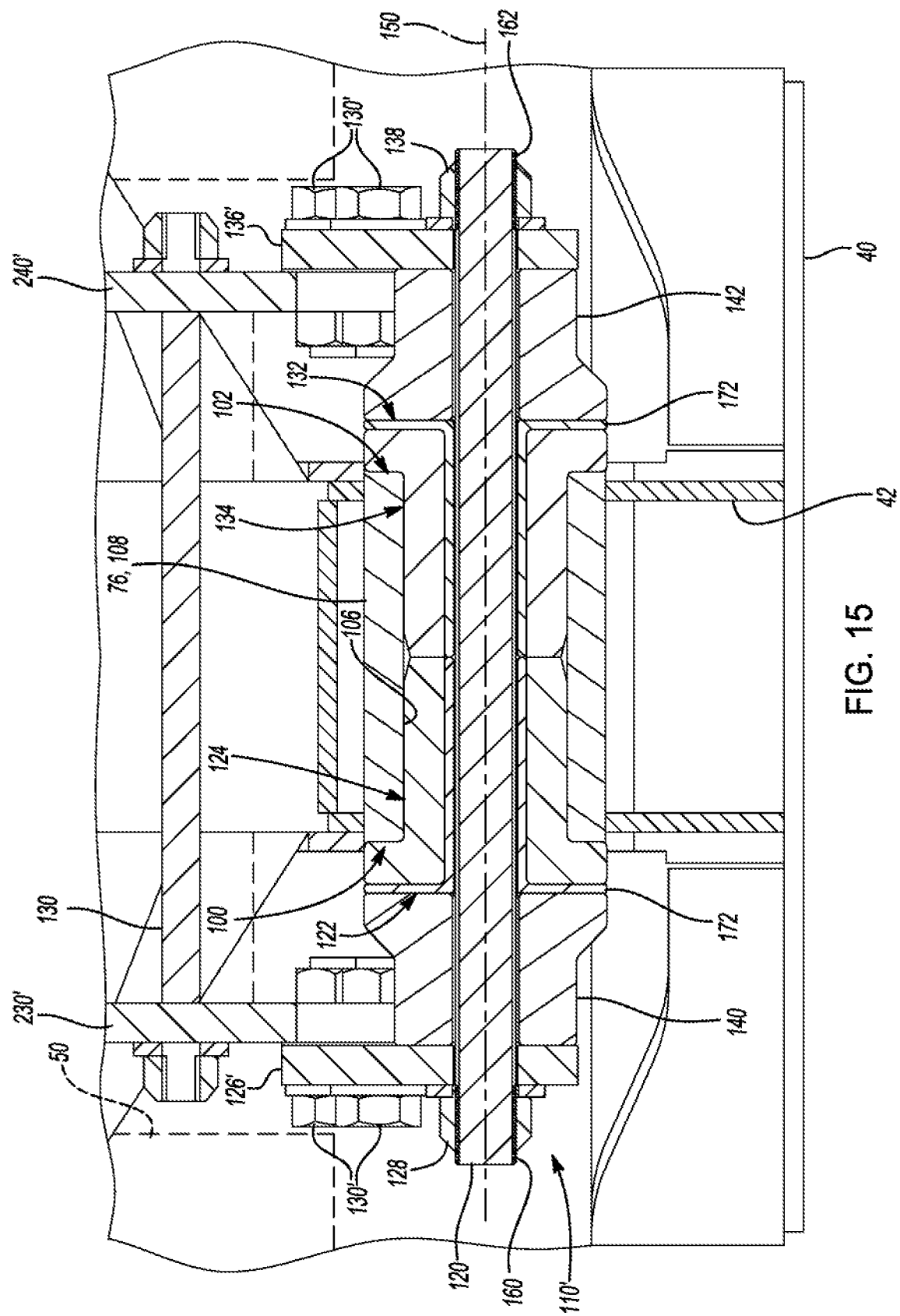
FIG. 15 is a section view along section line 15-15.

Referring to FIGS. 14 and 15, an alternative configuration of a mounting bracket subassembly 110' as shown. This configuration may be substantially similar to the mounting bracket subassembly 110 previously described but may include a modified first mounting plate 126', a modified second mounting plate 136', and the addition of a first extension plate 230' and a second extension plate 240'.

The first mounting plate 126' may extend from the rod 120 to the first extension plate 230'. The first mounting plate 126' may be axially positioned between the first nut 128 and the first sleeve 122 and may be axially positioned between the first nut 128 and the first spacer 140, if provided. The first mounting plate 126 may include a rod hole 210 as previously described and one or more fastener holes 212'. The rod 120 may extend through the rod hole 210. A fastener 130' such as a bolt may extend through the fastener hole 212' of the first mounting plate 126' to the first extension plate 230'

The first extension plate 230' may extend from the first mounting plate 126' and may be operatively connected to the drivetrain component 50. The first extension plate 230' may include at least one fastener hole 232' that may receive a corresponding fastener 130' and at least one fastener hole 234' that may receive a corresponding fastener 130 that may couple the first extension plate 230' to the drivetrain component 50.

The second mounting plate 136' may have the same configuration as the first mounting plate 126'. Accordingly, the second mounting plate 136' may have the same features as the first mounting plate 126'. The features of the second mounting plate 136' are provided with the same reference numbers as the corresponding feature of the first mounting plate 126'.

The second extension plate 240' may have the same configuration as the first extension plate 230'. Accordingly, the second extension plate 240' may have the same features as the first extension plate 230'. The features of the second extension plate 240' are provided with the same reference numbers as the corresponding feature of the first extension plate 230'.

The mounting bracket subassembly 110' shown in FIGS. 14 and 15 may be provided to accommodate situations where the fasteners 130 that are coupled to the drivetrain component 50 may be inaccessible or difficult to access, such as may occur when the mounting locations for the first extension plate 230' and/or the second extension plate 240' are received in a recess or recesses in the drivetrain component 50. For instance, the first extension plate 230' and the second extension plate 240' may be attached to the drivetrain component 50 with corresponding fasteners 130 before the first extension plate 230' and the second extension plate 240' are attached to the first mounting plate 126' and the second mounting plate 136', respectively. Then the first extension plate 230' and the second extension plate 240' may be attached to the first mounting plate 126' and the second mounting plate 136', respectively, with the fasteners 130'.

It is contemplated that drivetrain components 50 and suspension system components may be assembled to the skid plate module 22 prior to assembly to the chassis 20. As such, the skid plate module 22 may be a modular subassembly that may help streamline or simplify assembly of the vehicle.

Figure 2:
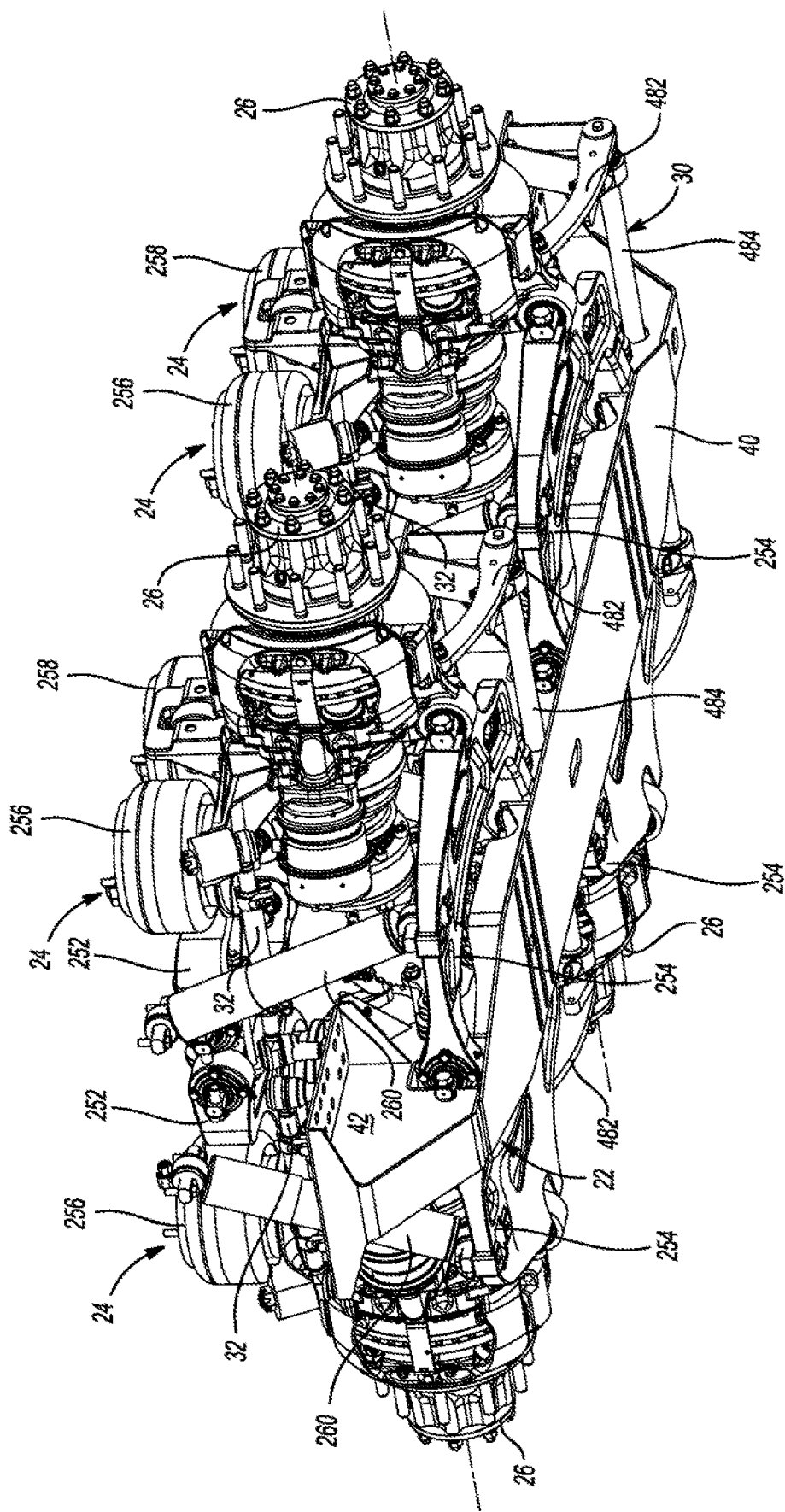
FIG. 2 is a perspective view of the assembly that includes the skid plate module and the suspension system of FIG. 1 but omits a chassis and drivetrain components for clarity.

Referring to FIGS. 1-3, a plurality of suspension systems 24 are shown. A suspension system 24 may connect one or more wheel end assemblies 26 to the chassis 20 and/or the skid plate module 22. In addition, the suspension system 24 may dampen vibrations associated with vehicle travel, provide a desired level of ride quality, control vehicle ride height, or combinations thereof. The suspension system 24 may be an independent suspension system that may allow wheels to move up and down independently with respect to each other or without influence from another wheel. FIGS. 4-8 show a portion of a suspension system 24 that is associated with a single wheel; however, is it to be understood that the suspension system 24 may be associated with multiple wheels. For instance, the components of the suspension system 24 that are shown in FIGS. 4-8 may be provided with a wheel like a right side wheel when viewed from a position in front of the vehicle. These components may also be provided as a mirror image when provided with an opposing wheel like a left side wheel. In at least one configuration, the suspension system 24 may include a knuckle 250, an upper control arm 252, a lower control arm 254, a first air spring 256, a second air spring 258, and a shock absorber 260.

Figure 5:
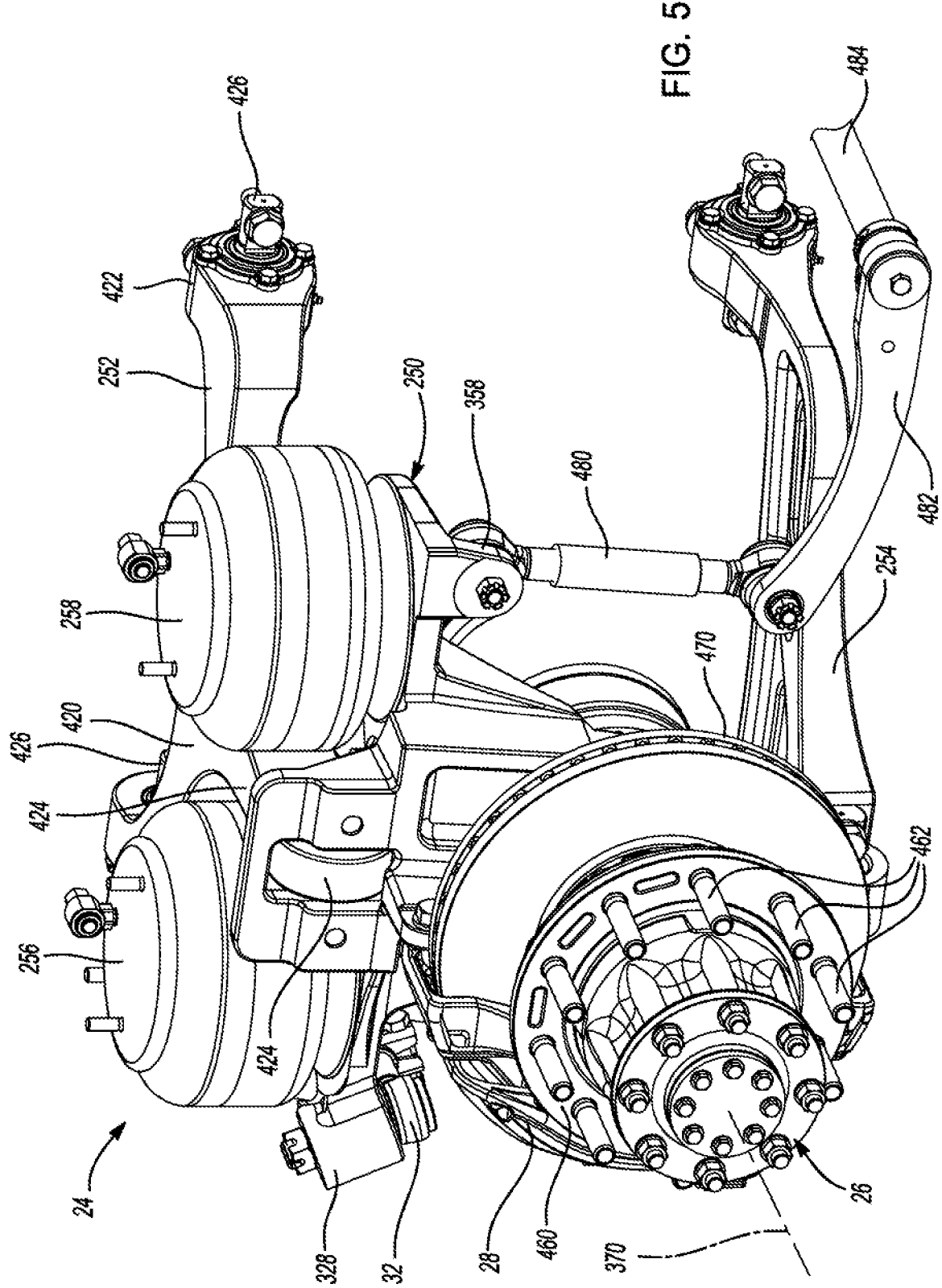
Figure 6:
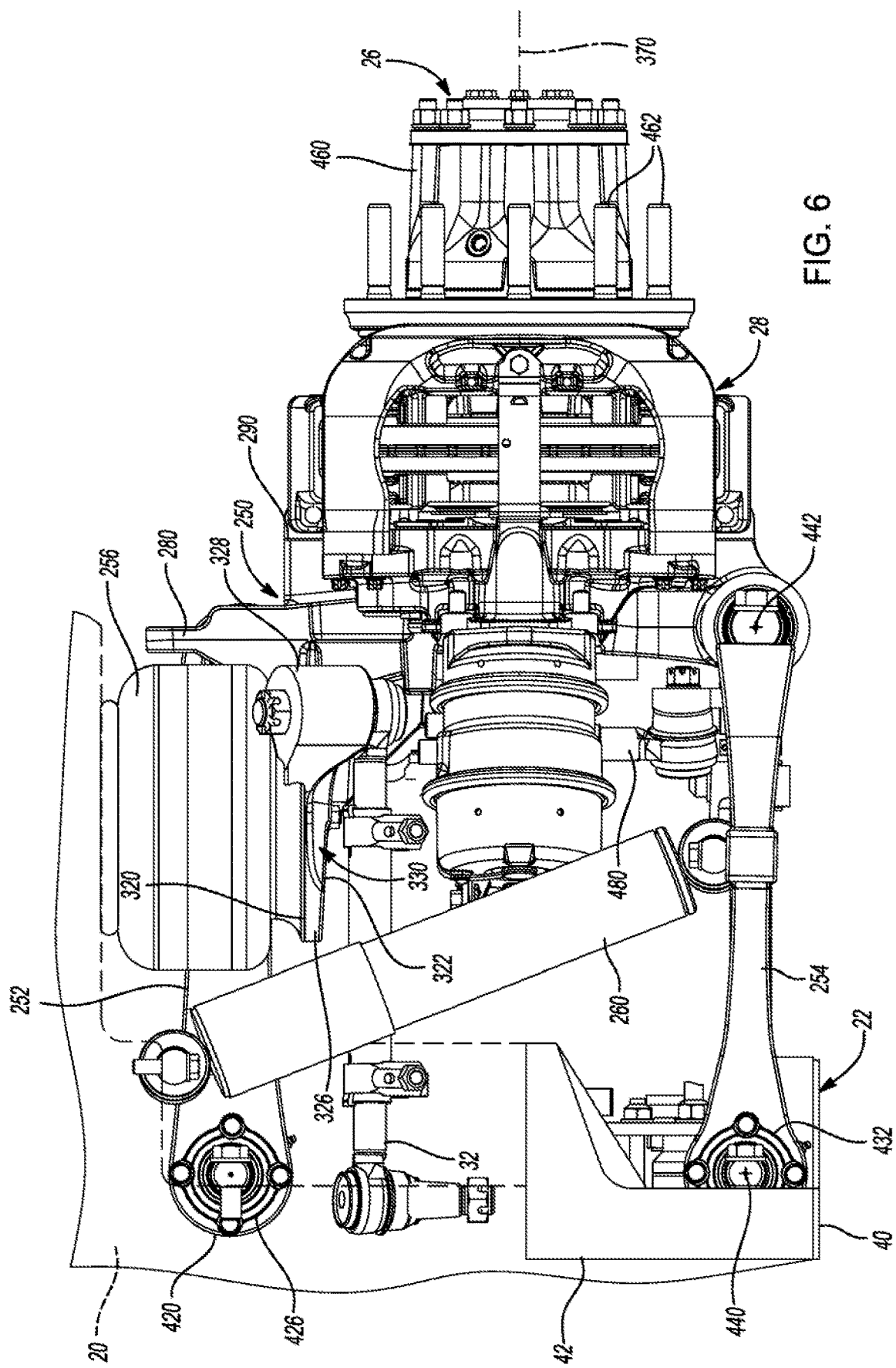
FIG. 6 is a front view of the portion of the suspension system shown in FIGS. 4 and 5.
Figure 7:
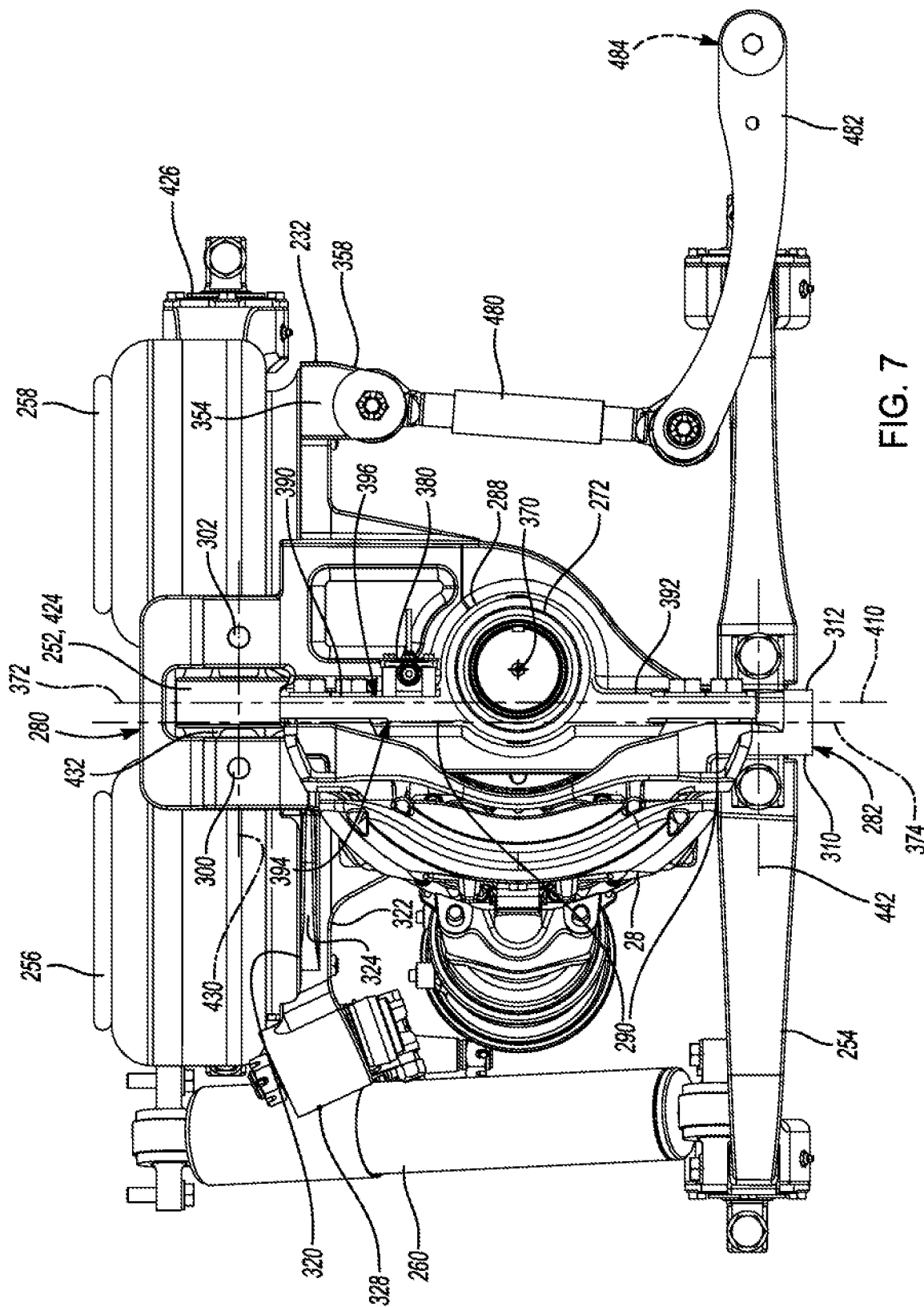
FIG. 7 is a side view of the portion of the suspension system shown in FIG. 6 omitting a wheel end assembly and an axle shaft.
Figure 8:
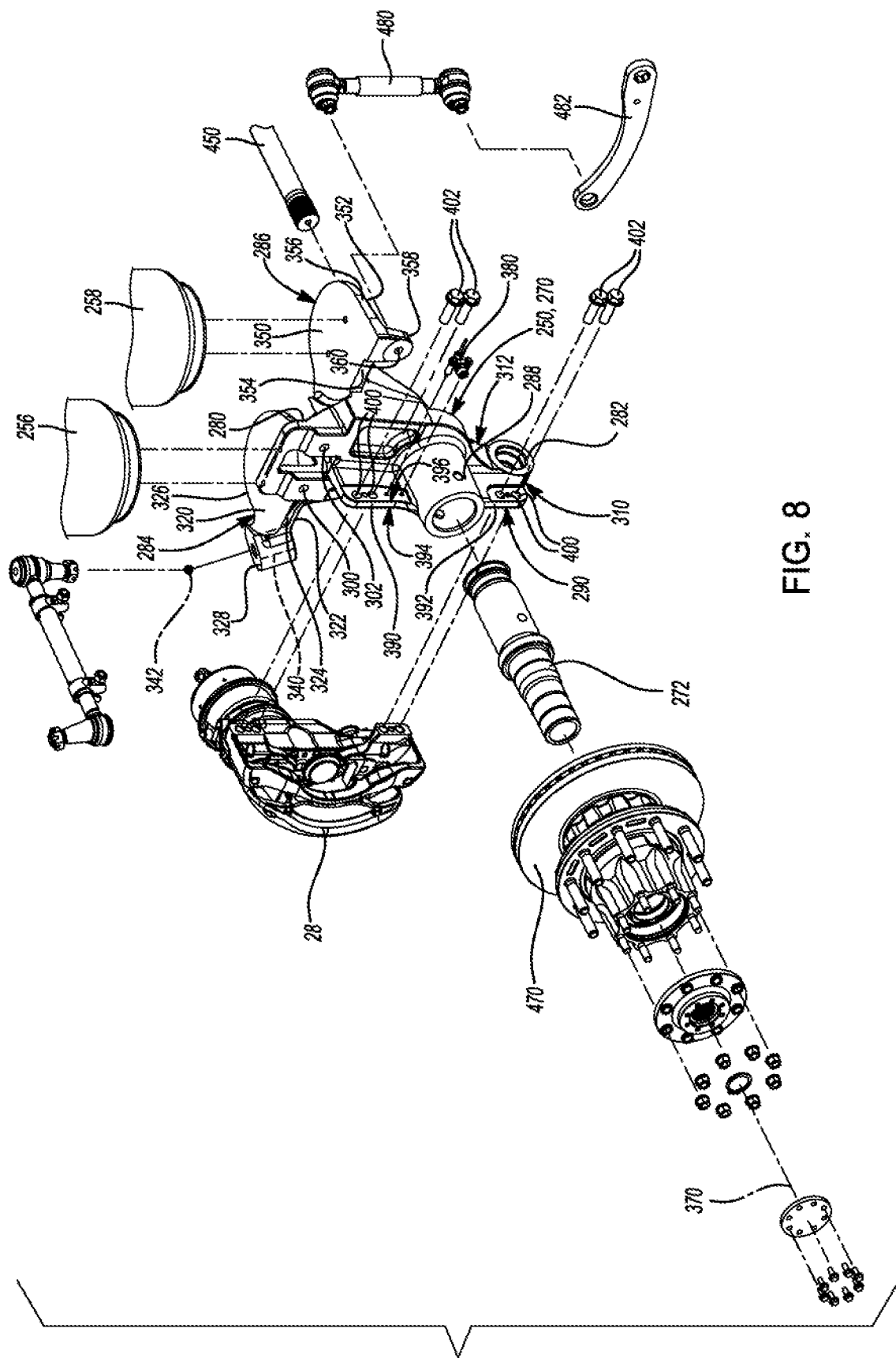
FIG. 8 is an exploded view of a portion of FIG. 5.

Referring to FIGS. 4-8, the knuckle 250 may rotatably support the wheel end assembly 26. In addition, the knuckle 250 may interconnect the wheel end assembly 26 to the upper control arm 252 and the lower control arm 254. As is best shown in FIGS. 7 and 8, the knuckle 250 may include a knuckle body 270 and a spindle 272.

The knuckle body 270 may facilitate mounting of various components to the knuckle 250. In at least one configuration, the knuckle body 270 may be configured as a unitary one-piece component, although it is contemplated that the knuckle body 270 could be an assembly of multiple components. The knuckle body 270 may include an upper control arm mount 280, a lower control arm mount 282, a first platform 284, a second platform 286, a spindle mount 288, and a brake torque plate 290.

The upper control arm mount 280 may be disposed near the top of the knuckle body 270. In addition, the upper control arm mount 280 may be longitudinally positioned between or disposed between the first platform 284 and the second platform 286. In at least one configuration, the upper control arm mount 280 may have a first mounting hole 300 and a second mounting hole 302 that may facilitate mounting of the upper control arm 252. The first mounting hole 300 and the second mounting hole 302 may each receive a fastener, such as a bolt, that may couple a pivot mechanism to the upper control arm mount 280. The pivot mechanism may facilitate rotation of the upper control arm 252 with respect to the knuckle 250 as will be discussed in more detail below.

The lower control arm mount 282 may be disposed near or at the bottom of the knuckle body 270. The lower control arm mount 282 may have any suitable configuration. For instance, the lower control arm mount 282 may be configured as an opening or aperture that may extend from a first side 310 of the knuckle body 270 to a second side 312 of the knuckle body 270. The first side 310 may face toward the front of the vehicle 10. The second side 312 may be disposed opposite the first side 310 and may face toward the rear of the vehicle 10. The lower control arm mount 282 may receive a pivot mechanism that may pivotally couple the lower control arm 254 to the knuckle body 270.

The first platform 284 may be disposed near the top of the knuckle body 270 and may be configured to support the first air spring 256. The first platform 284 may extend in a longitudinal direction that may extend away from the upper control arm mount 280 and toward the front of the vehicle 10. In addition, the first platform 284 may extend in a lateral direction that may extend away from the wheel end assembly 26 and toward the chassis 20 and the center plane 64. In at least one configuration, the first platform 284 may include a top side 320, a bottom side 322, a first side 324, a second side 326, and a toe link mount 328.

The top side 320 may face upward toward the first air spring 256. In addition, the top side 320 may engage the first air spring 256.

The bottom side 322 may be disposed opposite the top side 320. As such, the bottom side 322 may face away from the first air spring 256. In at least one configuration, the bottom side 322 may include a recess 330, which is best shown in FIG. 6.

The recess 330 may help provide clearance to the toe link 32 throughout its range of motion and the range of travel of the knuckle 250. The recess 330 may extend from the bottom side 322 toward the top side 320. In addition, the recess 330 may extend longitudinally from the second side 326 in a rearward direction toward the upper control arm mount 280 and the second platform 286.

The first side 324 may extend from the top side 320 to the bottom side 322. The first side 324 may face toward the wheel end assembly 26.

The second side 326 or portion thereof may extend from the top side 320 to the bottom side 322. The second side 326 may face toward the front of the vehicle 10 and may face away from the second platform 286.

The toe link mount 328 may extend from the first platform 284. Moreover, the toe link mount 328 may be integrally formed with the first platform 284. The toe link mount 328 may extend from the first platform 284 in multiple directions. For example, the toe link mount 328 may extend vertically such that the toe link mount 328 may extend above the top side 320 and below the bottom side 322 of the first platform 284. In addition, the toe link mount 328 may extend from the first side 324 to the second side 326. As such, the toe link mount 328 may extend away from the second platform 286 and protrude toward the front of the vehicle 10 and may protrude laterally away from the center plane 64.

The toe link mount 328 may have a toe link mounting hole 340. The toe link mounting hole 340 may extend along a toe link mounting hole axis 342. As such, the toe link mounting hole 340 may receive the toe link 32 and permit the toe link 32 to pivot with respect to the toe link mounting hole axis 342. The toe link mounting hole axis 342 may be disposed in a nonparallel and non-perpendicular relationship with the top side 320, bottom side 322, first side 324, second side 326, or combinations thereof. The toe link mount 328 may be spaced apart from other features of the knuckle 250.

The second platform 286 may be disposed near the top of the knuckle body 270 and may be configured to support the second air spring 258. The second platform 286 may be spaced apart from the first platform 284. Moreover, the second platform 286 may be disposed on an opposite side of the upper control arm mount 280 with respect to the first platform 284. As such, the upper control arm 252 may be positioned between the first platform 284 and the second platform 286 and the second platform 286 may extend in a longitudinal direction that may extend away from the first platform 284 and toward the rear of the vehicle 10. In addition, the second platform 286 may extend in a lateral direction that may extend away from the wheel end assembly 26 and toward the chassis 20 and the center plane 64. In at least one configuration, the second platform 286 may include a top side 350, a bottom side 352, a first side 354, a second side 356, and a stabilizer bar mount 358.

The top side 350 may face upward toward the second air spring 258. In addition, the top side 350 may engage the second air spring 258.

The bottom side 352 may be disposed opposite the top side 350. As such, the bottom side 352 may face away from the second air spring 258.

The first side 354 may extend from the top side 350 to the bottom side 352. The first side 354 may face toward the wheel end assembly 26.

The second side 356 may extend from the top side 350 to the bottom side 352. The second side 356 may face toward the rear of the vehicle 10 and may face away from the first platform 284. In addition, the second side 356 may extend from an end of the first side 354.

The stabilizer bar mount 358 may extend from the second platform 286. Moreover, the stabilizer bar mount 358 may be integrally formed with the second platform 286. The stabilizer bar mount 358 may extend from the first platform 284 in a downward vertical direction such that the stabilizer bar mount 358 extends from the bottom side 352 in a direction that extends away from the second air spring 258 and the top side 350. In addition, the stabilizer bar mount 358 may extend from the first side 354 and the second side 356 and may have sides or surfaces that may be aligned with or may be coplanar with the first side 354 and the second side 356. As such, the stabilizer bar mount 358 may generally be positioned at a rear outboard corner of the second platform 286. The stabilizer bar mount 358 may be spaced apart from other features of the knuckle 250.

The stabilizer bar mount 358 may have a stabilizer bar mount hole 360 that may receive the stabilizer bar subassembly 30. The stabilizer bar mount hole 360 may be disposed substantially perpendicular to the center plane 64.

Referring to FIGS. 7 and 8, the spindle mount 288 may be positioned below the upper control arm mount 280 and above the lower control arm mount 282. The spindle mount 288 may facilitate mounting of the spindle 272. For example, the spindle mount 288 may have a hollow tubular configuration that may be centered about a spindle mount axis 370 and may protrude from the knuckle body 270 toward the wheel end assembly 26. The spindle mount axis 370 may also be an axis of rotation of a wheel. As is best shown in FIG. 7, the spindle mount 288 and the spindle mount axis 370 may be longitudinally offset from the center of the upper control arm mount 280, the lower control arm mount 282, and the brake torque plate 290. For example, the spindle mount axis 370 may be disposed further rearward than a center plane 372 of the upper control arm mount 280, a center plane 374 of the lower control arm mount 282, and the brake torque plate 290. The center plane 372 of the upper control arm mount 280 may be disposed perpendicular to the center plane 64 of the skid plate module 22 and may be positioned at the longitudinal center of the upper control arm mount 280. The center plane 374 of the lower control arm mount 282 may be disposed perpendicular to the center plane 64 and may be positioned at the longitudinal center of the lower control arm mount 282.

Referring primarily to FIGS. 7 and 8, the brake torque plate 290 may facilitate mounting of the brake subsystem 28. In addition, the brake torque plate 290 may facilitate mounting of an antilock brake sensor 380. In at least one configuration, the brake torque plate 290 may extend from the spindle mount 288 and may include an upper portion 390, a lower portion 392, a front side 394, and a rear side 396.

The upper portion 390 may extend from the spindle mount 288 toward the upper control arm mount 280. The antilock brake sensor 380 may be mounted to the upper portion 390.

The lower portion 392 may be disposed opposite the upper portion 390 or on an opposite side of the spindle mount 288 from the upper portion 390. As such, the lower portion 392 may extend from the spindle mount 288 toward the lower control arm mount 282. The lower portion 392 may be aligned with the upper portion 390. As is best shown in FIG. 8, the lower portion 392 may be aligned with and may partially define the second side 312 of the lower control arm mount 282.

Referring to FIG. 8, the upper portion 390 and the lower portion 392 may include one or more brake mounting holes 400. The brake mounting holes 400 may receive fasteners 402, such as bolts, that may facilitate mounting of the brake subsystem 28 to the brake torque plate 290. For example, the brake subsystem 28 may be disposed on and may engage the front side 394 of the upper portion 390 in the lower portion 392. The front side 394 may face toward the front of the vehicle 10 or toward the first platform 284. The rear side 396 may be disposed opposite the front side 394 and may face toward the rear of the vehicle 10 or toward the second platform 286.

Referring to FIG. 7, the upper portion 390 and the lower portion 392 may be aligned with each other and may be disposed in a common plane. For example, the upper portion 390 and the lower portion 392 may be disposed in a brake torque plate plane 410 or may be centered with respect to a brake torque plate plane 410. The brake torque plate plane 410 may be disposed substantially perpendicular to the center plane 64. As such, the brake torque plate plane 410 may extend in a lateral vehicle direction. The brake torque plate plane 410 may be longitudinally positioned between the first mounting hole 300 and the second mounting hole 302 of the upper control arm mount 280 such that the brake torque plate plane 410 may be disposed closer to the first mounting hole 300 than the second mounting hole 302. In addition, the brake torque plate plane 410 may be disposed parallel to and may be positioned between the center plane 372 of the upper control arm mount 280 and the center plane 374 of the lower control arm mount 282.

In addition, the spindle mount axis 370 may be disposed parallel to the brake torque plate plane 410. The spindle mount axis 370 may be offset from the brake torque plate plane 410 such that the spindle mount axis 370 may be disposed further rearward than the center plane 372 of the upper control arm mount 280, the center plane 374 of the lower control arm mount 282 and the brake torque plate plane 410. As such, the spindle mount axis 370 may not intersect the brake torque plate plane 410.

Referring to FIG. 8, the spindle 272 may extend from the spindle mount 288. For example, the spindle 272 may be received in the spindle mount 288 and may be fixedly attached to the spindle mount 288 in any suitable manner, such as with an interference fit, welding, or with one or more fasteners. It is also contemplated that the spindle 272 may be integrally formed with the knuckle body 270 such that the spindle 272 and the knuckle body 270 are not separate components. The spindle 272 may rotatably support the wheel end assembly 26. For example, the spindle 272 may support one or more wheel bearings that rotatably support a hub as will be discussed in more detail below. The spindle 272 may extend along or around the spindle mount axis 370. In addition, the spindle 272 may be disposed between the upper portion 390 and the lower portion 392 of the spindle mount 288 in one or more configurations.

Referring to FIGS. 1 and 6, the upper control arm 252 may extend from a lateral side of the chassis 20 toward the knuckle 250. The upper control arm 252 may be pivotally or rotatably mounted to the chassis 20 and the knuckle 250 in a manner that allows the knuckle 250 and a corresponding wheel end assembly 26 to move up and down while inhibiting forward and backward movement. As is best shown with reference to FIG. 5, the upper control arm 252 may have a Y-shaped configuration and may include a first mounting arm 420, a second mounting arm 422, and a center arm 424.

The first mounting arm 420 and the second mounting arm 422 may be pivotally coupled or rotatably coupled to the chassis 20. For instance, the first mounting arm 420 and the second mounting arm 422 may rotate about a common axis. In at least one configuration, the first mounting arm 420 and the second mounting arm 422 may each have an aperture that may be disposed proximate a distal end. Each aperture may receive a pivot mechanism 426 that may pivotally couple the mounting arm to the chassis 20. The pivot mechanism 426 may have any suitable configuration. For example, the pivot mechanism 426 may include a pivot pin that may extend through the aperture. The pivot pin may be fixedly coupled to the chassis 20 in any suitable manner, such as with one or more fasteners like bolts.

Referring to FIGS. 5 and 7, the center arm 424 may be disposed between the first mounting arm 420 and the second mounting arm 422. The center arm 424 may be pivotally coupled or rotatably coupled to the knuckle 250. For instance, the center arm 424 may rotate about an upper control arm mount axis 430 that may be disposed perpendicular to the brake torque plate plane 410. In at least one configuration, the center arm 424 may include an aperture that may receive a pivot mechanism 432 that may pivotally couple the center arm 424 to the knuckle 250. For example, the pivot mechanism 432 may include a pivot pin that may extend through the aperture. The pivot pin may be fixedly coupled to the knuckle 250 in any suitable manner, such as with one or more fasteners like bolts. A portion of the center arm 424 may be longitudinally positioned between the first air spring 256 and the second air spring 258.

Referring to FIG. 6, the lower control arm 254 may be disposed below the upper control arm 252. The lower control arm 254 may extend from a lateral side of the skid plate module 22 toward the knuckle 250. The lower control arm 254 may be pivotally or rotatably mounted to the skid plate module 22 and the knuckle 250 in a manner that allows the knuckle 250 and a corresponding wheel end assembly 26 to move up and down while inhibiting forward and backward movement. The lower control arm 254 may have a different configuration than the upper control arm 252.

Referring to FIGS. 6 and 10, a lower control arm 254 may pivotally mounted to one or more pillars 42 with corresponding pivot mechanisms. For instance, one pivot mechanism 432 may pivotally connect a lower control arm 254 to the mounting sleeves 72 of one pillar 42 while another pivot mechanism 432 may pivotally connect a lower control arm 254 to the mounting sleeves 72 of another pillar 42. A lower control arm 254 may be pivotally mounted to the first pillar and the second pillar along a lower control arm pivot axis 440 while another lower control arm 254 may be pivotally mounted to the second pillar and the third pillar along the same axis. The lower control arm pivot axis 440 may be positioned closer to the skid plate 40 than the tubes 76. The lower control arm 254 may also be pivotally mounted to the knuckle 250 along a lower control arm mount axis 442 that may be disposed perpendicular to the brake torque plate plane 410.

An upper control arm 252 and a lower control arm 254 may be associated with each wheel end assembly 26. As such, upper control arms 252 and lower control arms 254 may extend from opposite sides of the chassis 20 in the skid plate module 22 to support different wheel end assemblies 26.

Referring to FIGS. 1-4, the first air spring 256 and the second air spring 258 may help dampen vibrations, provide a desired level of ride quality, and control ride height or the distance between the chassis and the road or support surface upon which a tire of the vehicle 10 is disposed.

Referring to FIGS. 6-8, the first air spring 256 may be fixedly disposed on the first platform 284. For example, the first air spring 256 may extend from the first platform 284 to the chassis 20. The first air spring 256 may have any suitable configuration. For instance, the first air spring 256 may have a flexible bellows and a piston. The flexible bellows may at least partially define a chamber within the first air spring 256 that may receive the piston and pressurized gas that may be provided by a pressurized gas supply system. Pressurized gas may be provided to the chamber or may be vented from the chamber to adjust the ride height and dampening characteristics of the suspension system. An upper mounting plate may be provided at the top of the flexible bellows to facilitate mounting of the flexible bellows to the chassis 20. The piston may be at least partially received in the flexible bellows and may extend from the first platform 284 toward the upper mounting plate. For example, the piston may be fixedly disposed on the first platform 284, such as with one or more fasteners, and may be generally disposed near the center of the flexible bellows.

The second air spring 258 may have a similar configuration or the same configuration as the first air spring 256. The second air spring 258 may be fixedly disposed on the second platform 286. For example, second air spring 258 may extend from the second platform 286 to the chassis 20. As such, the first air spring 256 and the second air spring 258 may be disposed on opposite sides of the upper control arm 252.

Referring to FIGS. 4-7, the shock absorber 260, which may also be referred to as a strut, may extend from the chassis 20 to the knuckle 250. For example, the shock absorber 260 may be pivotally mounted to the chassis 20 at a first end and may be pivotally mounted to the lower control arm 254 at a second end.

Referring to FIGS. 4-8, the wheel end assembly 26 may facilitate rotation a wheel that may support a tire. The wheel end assembly 26 may be part of a drive axle or a non-drive axle. A drive axle may receive torque from a power source, such as an engine or motor as previously discussed. In a drive axle configuration, a shaft 450, which is best shown in FIG. 8, such as an axle shaft or half shaft, may transmit torque to the wheel end assembly 26 to rotate a wheel that may be mounted on the wheel end assembly 26. For instance, the shaft 450 may be operatively connected at a first end to a drivetrain component 50 and may extend through the spindle 272 and be coupled to the wheel end assembly 26 at a second end. The shaft may be omitted in a non-drive axle configuration. In at least one configuration, the wheel end assembly 26 may include a hub 460.

The hub 460 may be rotatably disposed on the spindle 272. For example, one or more wheel bearings may be disposed on the spindle 272 and may rotatably support the hub 460. The hub 460 may facilitate mounting of the wheel, such as with a plurality of mounting studs 462. As such, the hub 460 and the wheel may rotate together about the spindle mount axis 370. A tire may be disposed on the wheel that may engage a road or support surface.

The brake subsystem 28 may facilitate braking of the wheel to slow rotation of the hub 460 and an associated wheel about the spindle mount axis 370. The brake subsystem 28 may have any suitable configuration. For instance, the brake subsystem 28 may be configured as a friction brake, such as a disc brake or a drum brake. In the figures, the brake subsystem 28 is depicted as a disc brake. In such a configuration, a brake friction member 470 configured as a brake rotor may be fixedly coupled to the hub 460 and may rotate with the hub 460. One or more brake pads may be actuated into engagement with the brake friction member 470 to slow rotation of the hub 460 and the wheel about the spindle mount axis 370.

Referring to FIGS. 1-3, the stabilizer bar subassembly 30 may help reduce body roll or side-to-side rolling of the vehicle 10, such as may occur during cornering. The stabilizer bar subassembly 30 may operatively connect opposing knuckles 250 of the vehicle 10. For example, the stabilizer bar subassembly 30 may be coupled to stabilizer bar mount 358 of the second platform 286. As is best shown with reference to FIGS. 3 and 5-8, the stabilizer bar subassembly 30 may include a pair of drop links 480, a pair of intermediate links 482, and a stabilizer bar 484. One drop link 480 may extend from the stabilizer bar mount 358 to a first end of an intermediate link 482. A second end of the intermediate link 482 may be coupled to a first end of the stabilizer bar 484. A mirror image arrangement of the drop link 480 and intermediate link 482 may be provided with an opposing knuckle 250. For instance, another drop link 480 may extend from the stabilizer bar mount 358 of a second platform 286 that is provided with an opposing knuckle 250 to a first end of another intermediate link 482, which in turn may extend to a second end of the stabilizer bar 484 that may be disposed opposite the first end. The drop links 480 may extend in a downward direction that may extend toward the lower control arm 254. The intermediate links 482 may extend in a rearward direction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension system comprising:
    a knuckle that rotatably supports a wheel end assembly and includes:
        a first platform that supports a first air spring and has a toe link mount; and
        a second platform that supports a second air spring and has a stabilizer bar mount, wherein the toe link mount extends above a top side of the first platform and below a bottom side of the first platform that is disposed opposite the top side.
2. The suspension system of claim 1 wherein the first platform and the second platform are spaced apart from each other.
3. The suspension system of claim 1 wherein the first platform and the second platform are disposed on opposite sides of an upper control arm.
4. The suspension system of claim 1 wherein the toe link mount extends from the first platform in a direction that extends away from the second platform.
5. The suspension system of claim 1 wherein the stabilizer bar mount extends from the second platform in a downward direction that extends away from the second air spring.
6. The suspension system of claim 1 wherein the toe link mount extends from a first side of the first platform that faces toward the wheel end assembly.
7. The suspension system of claim 6 wherein the toe link mount extends from a second side of the first platform that faces away from the second platform.
8. The suspension system of claim 7 wherein the toe link mount has a toe link mounting hole that receives the toe link and the toe link mounting hole extends along a toe link mounting hole axis that is disposed in a nonparallel and non-perpendicular relationship with the top side of the first platform.
9. The suspension system of claim 8 wherein a recess is provided in the bottom side of the first platform that extends from the second side and extends toward the top side, wherein the recess provides clearance to the toe link.
10. A suspension system comprising:
    a knuckle that rotatably supports a wheel end assembly and includes:
        a first platform that supports a first air spring and has a toe link mount; and
        a second platform that supports a second air spring and has a stabilizer bar mount, wherein the stabilizer bar mount extends from the second platform in a direction that extends away from the second air spring.
11. The suspension system of claim 10 wherein the stabilizer bar mount extends from a first side of the second platform that faces toward the wheel end assembly and extends from a second side of the second platform that extends from the first side, wherein the second side faces away from the first platform.
12. A suspension system comprising:
    a knuckle that rotatably supports a wheel end assembly and includes:
        a first platform that supports a first air spring;
        a second platform that supports a second air spring;
        an upper control arm mount that is disposed between the first platform and the second platform;
        a spindle mount that is disposed below the upper control arm mount; and
        a brake torque plate that extends from the spindle mount toward the upper control arm mount, wherein a brake subsystem is mounted to the brake torque plate, wherein the brake torque plate has an upper portion that extends from the spindle mount toward the upper control arm mount and a lower portion that is disposed opposite the upper portion and extends from the spindle mount toward a lower control arm mount.
13. The suspension system of claim 10 wherein the knuckle has a spindle mount and a brake torque plate that has an upper portion that extends from the spindle mount toward an upper control arm mount and a lower portion that is disposed opposite the upper portion and extends from the spindle mount toward a lower control arm mount.
14. The suspension system of claim 12 wherein the upper portion and the lower portion are disposed in a brake torque plate plane that is disposed perpendicular to an upper control arm mount axis and a lower control arm mount axis.
15. The suspension system of claim 14 wherein the spindle mount is centered about a spindle mount axis that is disposed parallel to the brake torque plate plane and the spindle mount axis is offset from the brake torque plate plane such that the spindle mount axis does not intersect the brake torque plate plane.
16. The suspension system of claim 14 wherein the lower control arm mount extends from a first side of the knuckle to a second side of the knuckle and the lower portion of the brake torque plate partially defines the second side.
17. The suspension system of claim 14 wherein the upper control arm mount has a first mounting hole and a second mounting hole that facilitate mounting of an upper control arm, wherein the brake torque plate plane extends between the first mounting hole and the second mounting hole and is disposed closer to the first mounting hole than the second mounting hole.
18. The suspension system of claim 14 wherein the brake torque plate plane is positioned between a center plane of the lower control arm mount and a center plane of the upper control arm mount that are disposed parallel to the center plane.
19. The suspension system of claim 14 wherein the brake torque plate has a front side that faces toward the first platform and a rear side that faces toward the second platform, wherein the brake subsystem is mounted to the front side.

20. The suspension system of claim 14 wherein an antilock brake sensor is mounted to the upper portion of the brake torque plate.

* * * * *